United States Patent [19]
Madsen et al.

[11] Patent Number: 5,827,942
[45] Date of Patent: Oct. 27, 1998

[54] SYSTEM AND METHOD FOR TESTING IMAGING PERFORMANCE OF ULTRASOUND SCANNERS AND OTHER MEDICAL IMAGERS

[75] Inventors: Ernest L. Madsen, Madison, Wis.; James M. Kofler, Jr., Rochester, Minn.

[73] Assignee: Wisconsin Alumni Research Foundation, Madison, Wis.

[21] Appl. No.: 951,381

[22] Filed: Oct. 16, 1997

[51] Int. Cl.⁶ .................................................. G01N 29/00
[52] U.S. Cl. .............................................................. 73/1.82
[58] Field of Search .................................. 73/1.82, 1.86; 324/317, 308; 600/437, 410, 425; 378/210

[56] References Cited

U.S. PATENT DOCUMENTS

| | | |
|---|---|---|
| 4,277,367 | 7/1981 | Madsen et al. . |
| 4,286,455 | 9/1981 | Ophir et al. . |
| 4,331,021 | 5/1982 | Lopez et al. . |
| 4,406,153 | 9/1983 | Ophir et al. . |
| 4,417,582 | 11/1983 | Trimmer et al. . |
| 4,453,408 | 6/1984 | Clayman . |
| 4,463,592 | 8/1984 | Flax et al. . |
| 4,476,549 | 10/1984 | Dragonette et al. . |
| 4,843,866 | 7/1989 | Madsen et al. . |
| 5,054,310 | 10/1991 | Flynn . |
| 5,276,726 | 1/1994 | Galkin . |
| 5,312,755 | 5/1994 | Madsen et al. . |
| 5,574,212 | 11/1996 | Madsen et al. . |
| 5,625,137 | 4/1997 | Madsen et al. . |
| 5,670,719 | 9/1997 | Madsen et al. . |

FOREIGN PATENT DOCUMENTS

| 2814336 | 5/1979 | Germany . |
|---|---|---|

OTHER PUBLICATIONS

J.M. Kofler, E.L. Madsen, J.A. Zagzebski, "Lesion Signal--to-Noise (LSNR) Measurements for Diagnostic Medical Ultrasound Performance Characterization," abstract presented at the American Association of Physicists in Medicine Annual Meeting held in Milwaukee, Wisconsin, Jul. 1997, published in Medical Physics, vol. 24, No. 6, Jun. 1997, p. 983.

J.M. Kofler, E.L. Madsen, J.A. Zagzebski, "An Automated Method for Performance Testing of Ultrasound Scanners Using Simulated Focal Lesions in a Regular Array," abstract presented at the American Association of Physicists in Medicine Annual Meeting held in Milwaukee, Wisconsin, Jul. 1997, published in Medical Physics, vol. 24, No. 6, Jun. 1997, p. 982.

J.M. Kofler, E.L. Madsen, J.A. Zagzebski, "An Automated Method for Detectability Determination of Simulated Focal Lesions in a Regular Array," abstract presented at the World Federation of Ultrasound in Medicine and Biology Meeting in Buenos Aires, Argentina, Sep. 1–5, 1997, published in Ultrasound in Medicine and Biology, vol. 23, supplement 1, 1997.

Smith, et al., "A contrast–detail analysis of diagnostic ultrasound imaging", Med. Phys., vol. 9, No. 1, pp. 4–12, Jan./Feb. 1982.

(List continued on next page.)

*Primary Examiner*—Robert Raevis
*Attorney, Agent, or Firm*—Foley & Lardner

[57] ABSTRACT

Automated testing of the resolution capability of medical imagers, such as ultrasound scanners, magnetic resonance imagers and computed tomography equipment, is carried out using phantoms having coplanar arrays of target objects, such as spheres, the locations of which are precisely known. Images of the phantom at positions containing background material and the target spheres are taken, digitized and processed to determine in the digitized images the locations of the target spheres by making use of the known location and spacing of the spheres. Lesion signal-to-noise ratios are then calculated at the now located positions of the target spheres in the image, and this information may be utilized to determine thresholds for detectability that allow evaluation of the performance of the imager being utilized.

38 Claims, 20 Drawing Sheets

OTHER PUBLICATIONS

Madsen, et al., "An Anthropomorphic Ultrasound Breast Phantom Containing Intermediate–Sized Scatterers", Ultrasound in Med. & Biol., vol. 8, No. 4, pp. 381–392, 1982.

Madsen, et al., "Anthropomorphic Breast Phantoms for Assessing Ultrasonic Imaging System Performance and for Training Ultrasonographers: Part I", J. Clin. Ultrasound, vol. 10, pp. 67–75, Feb. 1982.

Madsen, et al., "Anthropomorphic Breast Phantoms for Assessing Ultrasonic Imaging System Performance and for Training Ultrasonographers: Part II", J. Clin. Ultrasound, vol. 10, pp. 91–100, Mar. 1982.

Goldstein, et al., "Particle Image–resolution Test Object", J. Ultrasound Med., vol. 2, pp. 195–209, May 1983.

Wagner, et al., "Statistics of Speckle in Ultrasound B–Scans", IEEE Trans. on Sonics and Ultrasonics, vol. 30, No. 3, pp. 156–163, May 1983.

Smith, et al., "Low Contrast Detectability and Contrast/Detail Analysis in Medical Ultrasound", IEEE Trans. on Sonics and Ultrasonics, vol. 30, No. 3, pp. 164–173, May 1983.

Goodsitt, et al., "A Three Dimensional Model for Generating the Texture in B–Scan Ultrasound Images", Ultrasonic Imaging, vol. 5, pp. 253–279, 1983.

Madsen, et al., "Method of data reduction for accurate determination of acoustic backscatter coefficients", J. Acoust. Soc. Am., vol. 76, No. 3, pp. 913–923, Sep. 1984.

Smith, et al., "Frequency Independent Ultrasound Contrast-–Detail Analysis", Ultrasound in Med. & Biol, vol. 11, No. 3, pp. 467–477, May/Jun. 1985.

Wagner, et al., "Unified SNR analysis of medical imaging systems", Phys. Med. Biol., vol. 30, No. 6, pp. 489–518, 1985.

Thijssen, et al., "Gray Level Transforms and Lesion Detectability in Echographic Images", Ultrasonic Imaging, vol. 10, pp. 171–195, 1988.

Thijssen, et al., "Texture in Tissue Echograms", J. Ultrasound Med. vol. 9, pp. 215–229, 1990.

Lopez, et al., "Objective Analysis of Ultrasound Images by Use of a Computational Observer", IEEE Trans. on Med. Imaging, vol. 11, No. 4, pp. 496–506, Dec. 1992.

Insana, et al., "Visual detection efficiency in ultrasonic imaging: A framework for objective assessment of image quality," J. Acoust. Soc. Am., vol. 95, No. 4, Apr. 1994.

Carson, "What a Hospital Physicist Needs in a Transducer Characterization Standard: Are Tissue Equivalent Test Objects Necessary?," IEEE Trans. on Sonics and Ultrasonics, vol. SU–26, No. 1, Jan. 1979, pp. 1–6.

New Product Announcement, The Wisconsin Spherical Void Phantom, Oct. 1988.

Madsen, et al., "Tests of Array Transducer Performance Using New, Spherical Lesion Phantoms," Medical Physics, vol. 23, No. 6, p. 1092, Jun. 1996.

Wharton, et al. "Improved Automated Analysis for Determining Detectability of Low–to–Higher Contrast Spherical Simulated Lesions," Journal of Ultrasound in Medicine, vol. 16, No. 3, Mar., 1997.

Madsen, et al., "Oil–in–Gelatin Dispersions for Use as Ultrasonically Tissue–Mimicking Materials," Ultrasound in Med. & Biol., vol. 8, No. 3, pp. 277–287, 1982.

Burke, et al., "X–Ray Linear Attenuation Coefficients in the Mammographic Range for Ultrasonic Breast Phantom Materials," Radiology, vol. 142, No. 3, pp. 755–757, Mar. 1982.

Burlew, et al., "A New Ultrasound Tissue–Equivalent Material," Radiology, vol. 134, No. 2, pp. 517–520, Feb. 1980.

Madsen, et al., "Tissue Mimicking Materials for Ultrasound Phantoms," Med. Phys. 5(5), pp. 391–394, Sep./Oct. 1978.

Madsen, et al., "Low–Contrast Focal Lesion Detectability Phantom for $^1$H MR Imaging," Med. Phys. 18(3), pp. 549–554, May/Jun 1991.

Madsen, et al., "Low Contrast Focal Lesion Detection Ultrasound Phantoms with Regular Arrays of Spheres Facilitating Computer Analysis," Med. Phys., vol. 21, No. 6, p. 1002, Jun. 1994.

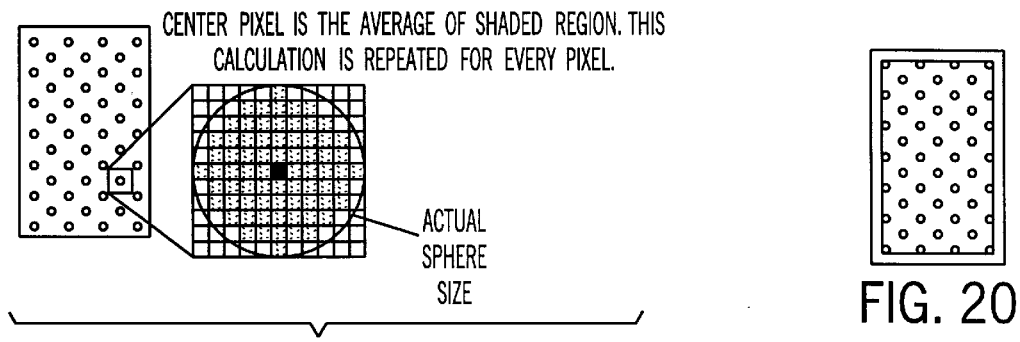
FIG. 19
FIG. 20
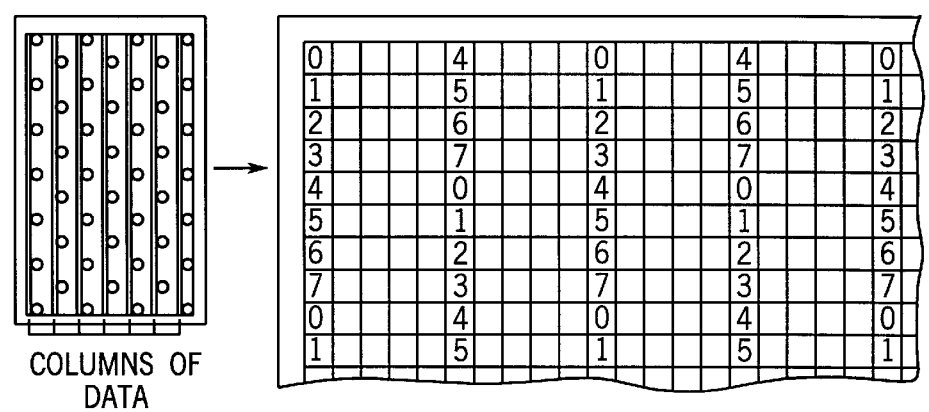
FIG. 21
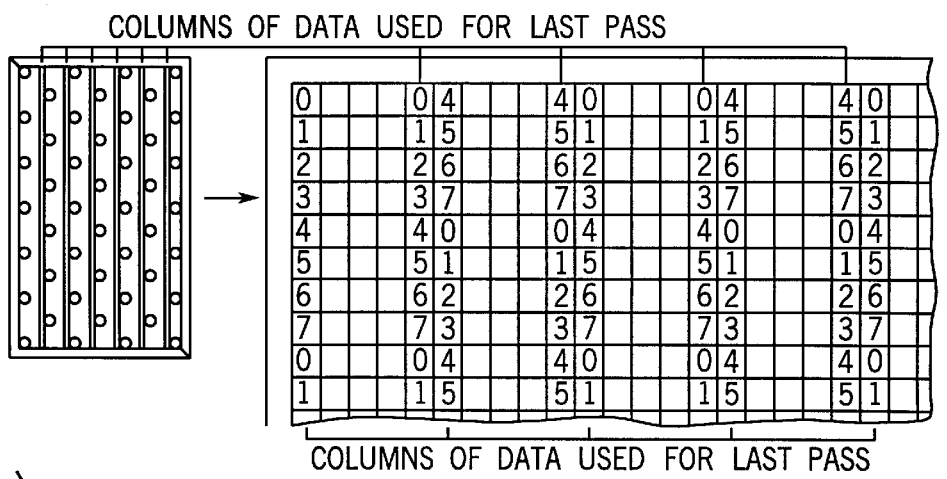
FIG. 22

SYSTEM AND METHOD FOR TESTING IMAGING PERFORMANCE OF ULTRASOUND SCANNERS AND OTHER MEDICAL IMAGERS

This invention was made with United States government support awarded by NIH Grant No. CA39224. The United States government has certain rights in this invention.

FIELD OF THE INVENTION

This invention pertains generally to the field of ultrasound scanners and other medical imagers, and more particularly to the testing of the resolution capabilities of such imagers using imaging phantoms as test objects.

BACKGROUND OF THE INVENTION

An ultrasound scanner is an integrated device which includes a scanning head and cooperating mechanical and electronic components, including a signal detection apparatus, for producing an ultrasound image. An ultrasound image is the result of a complicated set of physical phenomena, namely, the absorption, reflection, and coherent scattering from a tissue medium of pulsed radio frequency ultrasonic pressure waves, and the electronic detection of the backscattered or echo pulses for display as an image. The resulting pictures have a granular structure variously described by the terms texture or speckle. The resolution capability of an ultrasound scanner is its capacity to produce an image distinguishing a target object in a scanned volume, known as a slice, from the texture in the image produced from adjacent background material. An object which is resolved may be said to be detected by an ultrasound scanner. Typically, the signal detection apparatus of an ultrasound scanner includes a monitor for displaying a visual image. To be resolved, when only such a monitor is in use, an object must be detectable by an examination of such an image.

The resolution of target objects in a clinical ultrasound scan is possible because of the ultrasonic differentiation of tissue structures, primarily through variations in the scattering of ultrasonic waves by these tissues. This diffuse scattering gives rise to the texture pattern of an ultrasound image of a clinical object where variations in gray level are seen in the displayed image. Often, the mean gray level of a displayed object of interest, e.g. a tumor, will be different from that of the surrounding tissue. In other words, there is displayed image contrast between the object of interest and the background. The displayed image contrast is associated with the object contrast between the material of the object of interest and the background material. The object contrast, in turn, is a function of the difference, or ratio, of the backscatter coefficients of the two media involved, one for the object of interest material, the other for the background material.

Detectability of an object in an ultrasound image depends on three factors: (1) the size of the object, (2) the object contrast, and (3) the nature of the texture or speckle pattern of the object with respect to its background surroundings. The first two factors are determined by the material being imaged, whereas the third factor is strongly dependent on the scanner instrumentation. Thus, the smaller the object the less detectable, or resolvable, it is. At the same time, the less the object contrast, the less detectable the object is. Object contrast is based on the backscatter coefficients of the material of the object of interest, the target object or lesion, and the surrounding background material. Object contrast may be defined, in decibels, to be:

$$C = 10 \log_{10}(\eta_1/\eta_b) \qquad (1)$$

where:

C is the object contrast;

$\eta_1$ is the backscatter coefficient of the target lesion material; and $\eta_b$ is the backscatter coefficient of the surrounding background material.

The resolution performance of ultrasound scanners may be tested using ultrasound test objects known as phantoms. Most current commercially available phantoms for testing performance of ultrasound scanners contain a uniform background material which is tissue mimicking in terms of ultrasonic attenuation, propagation speed and backscatter coefficient. Such a material is described in U.S. Pat. No. 4,277,367, to Madsen, et al., entitled "Phantom Material and Method." A variety of types of phantoms are used to determine the resolution abilities of ultrasound scanners. Most of these phantoms contain objects to be detected. For example, one type of phantom contains metal or plastic fibers, arranged either individually or in pairs, oriented perpendicular to the scanning plane. An ultrasound scanner is thereby tested by a determination of the least separation between fibers such that they can still be resolved.

Another type of phantom consists of a block of tissue mimicking material, e.g., gelatin, containing long, thin cones or, alternatively, stepped cylinders of tissue mimicking material. Both the block of tissue mimicking material and the target cones or cylinders within it, contain plastic beads or other particles that function as ultrasound scatterers. Each stepped cylinder contains scatterers of a different size and/or concentration relative to the scatterers contained in the background material so that the scattering level of the background material is different from that of each cylinder. The cylinders, therefore, have a controlled object contrast level. During use, the axes of the cone or cylinder shaped target objects are maintained at right angles to the scanning plane (the plane of symmetry of the scanned slice).

The cylindrical or shallow tapered conical geometry of the target objects in the phantoms just described results in a fairly constant object contrast being maintained over the intersection of the target cylinder or cone with the scan slice. A shortcoming of such a geometry is that it does not provide for a realistic determination of detectability of a target when the diameter of the cylinder is in the range of, or less than, the slice width. This is because there is almost never a clinical situation in which an object of interest has translational symmetry perpendicular to the scan plane. Thus, since no attempt is made to approximate the three-dimensional shape of the lesions commonly being searched for in clinical applications of ultrasound scanning, the significant effect of the width of the slice on detectability is not dealt with. Thus, tests involving cylindrical targets do not adequately evaluate an ultrasound scanner regarding detection of focal lesions.

It has, therefore, been recognized that a focal lesion is realistically represented with a sphere. U.S. Pat. No. 4,843,866, to Madsen, et al., entitled Ultrasound Phantom, describes an ultrasound phantom including testing spheres having backscatter coefficients different from the backscatter coefficient of the tissue mimicking material in which they are embedded. In that invention, the testing spheres are located within the phantom body in a random array in order to eliminate the possibility of user bias when resolution characteristics are being tested by human observers. Another embodiment of that invention includes a phantom body divided into multiple subsections, with the spheres within a subsection having a uniform size and backscatter coefficient. Each subsection may contain testing spheres that differ in size or backscatter coefficient, or both, from spheres in the other subsections.

Evaluations of ultrasound scanner performance have been made using a phantom in which a large number of spherical simulated lesions are randomly distributed as described above. For example, these phantoms were used to assess focal lesion detectability performance of various ultrasound scanner configurations. Estimations were made by a group of human observers of the proximal (shortest) distance from the scanning head where lesions may first be resolved, and distal (farthest) distance from the scanning head where lesions become no longer resolvable, to ascertain the limits of the depth range over which lesions of a given size and contrast were detectable. The depth range of detectability lies between the proximal and distal distances and may be referred to as the resolution zone. For a given image depth and object contrast there will be a minimum lesion diameter which is resolvable and for which detection exists. A graph of the contrast versus the minimum diameter of lesion detectable at a certain depth is the contrast-detail curve at that depth. Thus, if the proximal and distal limits of the depth range are known for a sufficiently broad range of lesion diameters and contrasts for a certain imager configuration, this is equivalent to knowledge of the contrast-detail curves at all depths.

There are, however, shortcomings to this method for determining the proximal and distal limits of the depth range of detectability. Firstly, the process for estimation of the proximal and distal depth ranges by an observer can be time-consuming, especially if a reasonably large set of combinations of target lesion diameters and contrasts are involved. Secondly, estimations of the proximal and distal limits of the depth range can depend on the experience of the human observer.

Therefore, although ultrasound phantoms such as those described make possible many different types of performance measurements, it is still uncommon for clinical personnel to obtain specifications, make purchase decisions, and evaluate ultrasound scanners using quantitative image performance criteria. They rely almost solely on clinical impressions when judging the performance of a scanner. A more automated method for determining focal lesion detectability would nullify these limitations, and, consequently, foster much more widespread use of these types of resolution tests.

A computer-based method for the analysis and evaluation of ultrasound images is presented in a paper by Hector Lopez, et al., "Objective Analysis of Ultrasound Images by Use of a Computational Observer", IEEE Transactions on Medical Imaging, Vol. 11, No. 4, pp. 496–506, 1992. This method employs the concept of a "matched filter" with ultrasound phantoms containing low contrast cone—shaped—essentially cylindrical—targets to do objective contrast-detail studies. This matched filter technique is conceptually simple when the target object is basically cylindrical in shape, with axial symmetry of mean object contrast along the cylinder, and where the cylinder is oriented perpendicular to the ultrasound scan slice. The first step of this method is the making of an ultrasound scan image of a slice perpendicular to the cylindrical target, which is then digitized. The digital image is then sectored, and location coordinates for each target object in the image are established. The signal to noise ratio (SNR) of the target object is then calculated. If the target has positive object contrast and the target SNR exceeds a predetermined positive threshold value, the target is said to be detectable; for SNR values less than the threshold the target is said to be undetectable. If the target has negative object contrast and the target SNR is less than (more negative than) a predetermined negative threshold value, the target is said to be detectable; for SNR values greater than (less negative than) the threshold, the target is said to be undetectable.

A lesion signal to noise ratio, $(SNR)_{ML}$, calculated by the matched filter method, and discussed above, is defined as:

$$(SNR)_{ML} \equiv (S_{ML} - S_{MB})/(\sigma_B^2 + \sigma_L^2)^{1/2}. \quad (2)$$

Note that $(SNR)_{ML}$ does not represent a simple pixel signal to noise ratio but depends on the size of the target lesion whose detectability is being analyzed. In Equation 2, $S_{MB}$ reflects an average of pixel values of an image of the phantom background material. $S_{MB}$ is the ensemble average of a large number of independent realizations of $S_B$, which is defined as:

$$S_B \equiv (1/n) \Sigma_{i=1}^{n} P_{iB}^{m} \quad (3)$$

$S_B$ is the mean of the mth power of the image pixel values over the projected (usually circular) area of the focal lesion in the image plane in an area known to contain no lesions (background) The projected area is known a priori. This area will contain n pixels, each having a pixel value $P_{iB}$. $S_B$ is then calculated over an area of n pixels in a portion of the image plane which contains background material only, and no lesions. $S_{MB}$ is then the average of a large number of independent calculations of $S_B$ over several such n pixel areas in areas of the image containing background material only.

This calculation may be made using either the "amplitude" or the "intensity" value of each pixel in the area containing n pixels. If m=1, then $P_{iB}^{m}$ is called the pixel amplitude, and $S_B$ is called the pixel amplitude mean. If m=2, then $P_{iB}^{m}$ is called the pixel intensity, and $S_B$ is called the pixel intensity mean.

In Equation 2, $S_{ML}$ reflects an average of the average pixel values of an image of the phantom lesion material. That is, $S_{ML}$ is the ensemble average of $S_L$ for independent realizations of $S_L$ where:

$$S_L = (1/n) \sum_{i=1}^{n} W_L(r_i) P_{iL}^{m} \quad (4)$$

$S_L$ is the weighted mean of the mth power of the image pixel values over an area in the image corresponding to the known location of lesion. As discussed above, this area will contain n pixels, each having a pixel value $P_{iL}$. $S_L$ is then calculated over this same n pixel area of the image known to correspond to the position of a target lesion. $S_{ML}$ is then the average of independent calculations of $S_L$ over multiple n pixel areas in a set of images which are statistically independent. In other words, the speckle patterns in the ensemble of images must be statistically independent. This means that independent physical realizations of the target lesions and background material must be used. If the simulated lesions are cylinders oriented perpendicularly to the scanning slice, then the images (and speckle patterns) will be statistically independent if the scan slices do not overlap one another.

$W_L(r_i)$, in Equation 4, is a weighting function of the distance, $r_i$, from the center of the circular target area over which $S_L$ is being calculated. This factor depends on the expectation value of $P_i$ relative to that of the background material. If $W_L(r_i)$ is independent of the distance from the center of the lesion area, $r_i$, corresponding to an infinitely long cylinder with uniform ultrasonic properties, including backscatter coefficient, then $W_L(r_t)=1$.

The final two components of Equation 2 are $\sigma_B$ and $\sigma_L$. $\sigma_B$ is the standard deviation of the ensemble of $S_B$ values, and $\sigma_L$ is the standard deviation of the ensemble of $S_L$ values.

An automated human-observer-calibrated image analysis testing system and method which employs a modified matched filter approach is described in U.S. Pat. No. 5,574,212 to Madsen et al. In accordance with this patent, an ultrasound scanner phantom containing background material mimicking the ultrasonic characteristics of human tissue and coplanar spherical target lesions ultrasonically contrasting with the background material is scanned using the ultrasound scanner to be tested. Digitized images are made of the ultrasound scan of slices in the ultrasound phantom containing background material only and of slices on which the focal lesions are centered. A lesion signal-to-noise ratio $(SNR)_L=(S_L-S_{MB})/\sigma_B$ is then calculated at each defined pixel coordinate in the target lesion slice. This calculation employs (1) a pixel value average, $S_L$, calculated over a sample area of the target image slice centered at a pixel location and which is of a size approximately that of the cross-sectional area of the target lesions, (2) an average pixel value, $S_B$, calculated over an averaging area centered at the same pixel location, but extending over a larger area containing mostly background image data, and (3) a standard deviation of averaged pixel values, over a set of sample areas calculated in the background material image plane over an area centered at the same pixel location. At any given pixel at which the calculation is made, the $S_L$ may not and usually will not be calculated over an area at which the image of a spherical target exists. The proximal and distal depth range limits of detectability of an ultrasound scanner, for a given lesion diameter and contrast, may then be determined based on the number of pixel locations in a depth range of the scanned plane having an absolute value $(SNR)_L$ lying beyond a threshold value.

Using this approach, the exact positions of the spheres constituting the lesions in the phantom need not be known and the spheres need not be precisely positioned with respect to each other within the phantom although their centers should be coplanar. The lesion $(SNR)_L$ is calculated at each defined pixel location in the target slice image using an average target slice pixel value calculated from image data over a sample area centered at the pixel location in the target slice image, an average background pixel value calculated from image data over a first averaging area centered at the pixel location and including mostly background image data, and an average background plane pixel value standard deviation calculated from image data over a second averaging area including the pixel location in the background slice image. The number of pixel locations in a sample depth range for which the absolute value of the lesion $(SNR)_L$ exceeds a first threshold value is then determined, and the depth range of detectability is determined by determining the sample depth at which the number of pixel locations where the absolute value of the lesion $(SNR)_L$ lies beyond the first threshold value also exceeds a second threshold value, and this sample depth is then displayed. The first and second threshold values may be chosen to optimize agreement with averaged proximal and distal depth range values as perceived by experienced human observers. A human observer calibrated system of this type may be subject to false positives, i.e., detecting lesions in the image where there are none in the phantom due to random background fluctuation. While such an approach corresponds well with the observations that an experienced human observer would make of the same image, because the expected positions of the target spheres are not known, it does not directly measure the ability of the ultrasound imager to detect each target lesion that should be found in the target slice. In addition, the standard deviation, or noise, may be artificially high near the periphery of the images because of local gradients in local mean pixel values in the portions of the image near the periphery.

Wharton and Madsen improved the modified matched-filter method by acknowledging that human observers could compensate for local pixel gradients within the image. See D. B. Wharton, E. L. Madsen, "Improved Automated Analysis for Determining Detectability of Low-to-Higher Contrast Spherical Simulated Lesions," J. Ultrasound in Med., Vol. 16, No. 3 (supplement) p. 562 (1997). The gradients often appear near the lateral edges and bottom of the ultrasound images and, consequently, the previously described $(SNR)_L$ measurement can be biased from an inflated standard deviation. The standard deviation was therefore replaced with a standard error method (SEM) calculation. The SEM adjusts the standard deviation value by determining the gradient of local mean pixel values within a given region and calculating the standard deviation with respect to a bilinear curve-fitted surface. The SEM represents the "standard deviation" from the fitted plane. Note that in the absence of local mean pixel value gradients, the SEM reduces to the conventional standard deviation. Using the SEM, the noise is calculated as $$\sigma_B = \left[ \frac{\sum_{n=1}^{N} (Z_n - Z_{nc})^2}{N} \right]^{1/2} \quad (5)$$

where $Z_n$ is the mean over the nth sub-area over a larger area in the background image centered at the pixel location of concern, $Z_{nc}=a+bX_n+cY_n$, and the coefficients a, b and c are found from the relations $$\Sigma Z_n = aN + b\Sigma X_n + c\Sigma Y_n,$$

$$\Sigma Z_n X_n = a\Sigma X_n + b\Sigma X^2_n + c\Sigma X_n Y_n,$$

and $$\Sigma Z_n Y_n = a\Sigma Y_n + b\Sigma X_n Y_n + c\Sigma X_n Y_n.$$

The X and Y variables refer to the x- and y-coordinates within the region being interrogated.

The results of Wharton and Madsen demonstrated an increased sensitivity in the $(SNR)_L$ measurement due to the removal of local gradient effects. The level of detectability was improved for regions near the periphery and where any large non-uniformities exist, such as with improperly set time-gain compensation.

The performance of other types of medical imagers, such as magnetic resonance imagers (MRI) and computed tomography (CT) equipment can also be evaluated using phantoms. Materials with various contrasts relative to the background have been produced and formed into phantoms for MRI imaging equipment including exact positioning of spheres with coplanar centers. See, E. L. Madsen, J. C. Blechinger and G. R. Frank, "Low-contrast focal lesion detectability phantom for $^1$H MR imaging," Med. Phys. 18, 549–554 (1991); and U.S. Pat. No. 5,312,755, E. L. Madsen, J. C. Blechinger and G. R. Frank (1994). For CT imagers, variations in contrast can be accomplished through variations (between sphere material and background material) in volume fraction of uniformly suspended powdered graphite, microscopic glass beads or microscopic droplets of emulsified oil in solid gelatin or ager. E. L. Madsen, J. A.

Zagzebski, R. A. Banjavic, R. E. Jutila, "Tissue-mimicking materials for ultrasound phantoms," Med. Phys. 5, 391–394 (1978); M. M. Burlew, E. L. Madsen, J. A. Zagzebski, R. A. Banjavic, S. W. Sum, "A new ultrasound tissue-equivalent material," Radiology 134, 517–520 (1980); T. M. Burke, E. L. Madsen, J. A. Zagzebski, "X-ray linear attenuation coefficients in the mammographic range for ultrasonic breast phantom materials," Radiology 142, 755–757 (1982); E. L. Madsen, J. A. Zagzebski and G. R. Frank, "Oil-in-gelatin dispersions for use as ultrasonically tissue-mimicking materials," Ultrasound in Med. & Biol. 8, 277–287 (1982). The parameter varied is the effective atomic number.

SUMMARY OF THE INVENTION

In accordance with the present invention, automated testing of the resolution capability of medical imagers such as an ultrasound scanner system is accomplished with a high degree of reliability and objectivity. The testing of imagers can be carried out rapidly and conveniently by clinical personnel using standardized phantoms. The testing of imagers with such standardized phantoms permits quantification of the diagnostic effectiveness of the imagers in a manner which correlates well with results obtained on such imagers from observations made by skilled human observers.

The present invention utilizes phantoms having coplanar arrays of target objects, preferably spheres, imbedded in the body material of the phantom. For ultrasound imaging, the phantom is produced so that the target spheres, differing in contrast from the surrounding body material, are arranged in each coplanar array in multiple rows of successively greater depth from the scanning window of the phantom to which the head of the ultrasound scanner is applied. The target spheres in the phantom are arranged so that the centers of the spheres are precisely spaced from each other in the array at known positions, preferably, but not necessarily, with uniform spacing between the spheres in each row and uniform spacing of the rows. Generally, the spheres are arranged so that their relative positions are known and the number of spheres per unit area is constant, on average, over the image area. Preferably, the spheres are arranged in the array to define rows and columns. The precise positioning of the target spheres enables the expected positions of the target spheres to be correlated with the image obtained by the ultrasound scanner when the array of target spheres is centered in the scan slice.

In the system of the present invention for testing the imaging performance of ultrasound scanners, or other medical imagers, the video output from the imager—for the ultrasound scanner, containing the video output signal corresponding to the scanning by the ultrasound scanning head at the phantom—is converted to digital data representing a frame of the image, such as by a video frame grabber, the digitized image data is then analyzed by a computer, and the results of the analysis are displayed by the system.

Preferably, in accordance with the present invention, the evaluation of the image is essentially human observer independent. The ultrasound phantom is constructed to have positions at which the ultrasound head may be placed under which there are no simulated target lesions (target spheres) so that background image data can be obtained. The phantom may also include multiple arrays of coplanar target objects, each having a different target sphere diameter and/or target contrast.

In carrying out a test of an ultrasound scanner, the user takes images with the scan head positioned on the phantom to obtain one or more frames of background image data and then positioned at one or more of the coplanar arrays of target objects to obtain an image (or images) of the array (or arrays). The digitized data resulting from the scans is then analyzed by the system of the invention to isolate the image components of the ultrasound scan from extraneous information in the video frame, to locate the positions of the target objects in each image frame utilizing the known spacing and diameter of the target objects, to determine the $(SNR)_L$ at the positions so located of the target objects, and to provide the results of the analysis to a user in a form which allows conclusions to be drawn regarding the performance of the ultrasound scanner. These displays of results may include a graphical depiction of the depth of a row of target objects (simulated lesions) in the coplanar array of targets versus mean signal-to-noise ratio, $(SNR)_{ML}$, for that row, allowing the proximal and distal range of resolution of the ultrasound scanner to be assessed in terms of a detectability threshold. Preferably mean $(SNR)_L$'s at the various depths of the target spheres, generally corresponding to $(SNR)_{ML}$ as discussed above, are determined and displayed.

In a preferred testing procedure in accordance with the invention, scans are taken at several background positions in the phantom (e.g., four) to acquire multiple background images, and at one or more positions including the target spheres to acquire target images.

Because the spacing of the target objects and the diameter of the target objects in the phantom from which the target image is taken are known, the present invention utilizes this information to locate in the target image the expected positions of the target objects. To obtain usable information, the target image is taken by an operator at a position on the phantom such that the target image is taken entirely through a section of the phantom containing target spheres (i.e., that the target image does not include a section of the phantom that is laterally beyond the array of target spheres), that the centers of the target spheres in the array are coplanar, and that the target image is taken by the operator substantially through the plane in which the centers of the target spheres lie. In carrying out the invention, the spacing of the target spheres within the array in the target image is known and this information is preprogrammed into the system. When the target image is acquired, however, the actual positions within the target image at which the target spheres should be located is not known. Thus, in accordance with the invention, the pixel locations in the target image corresponding to the centers of the target spheres is first found, and then the mean lesion signal-to-noise ratio is computed at the positions of the target lesions within the target image.

It is preferable in carrying out the invention that the values of the lesion $SNR_L$ at each pixel location in the target image be computed and stored in computer memory in the system. To determine the pixel locations, the system then computes the mean $(SNR)_L$ over a sufficient number of placements of an array of pixel locations so that the maximum mean-$(SNR)_L$ found by this process corresponds to a superposition of the $(SNR)_L$ array onto the array of pixel locations corresponding to the target positions. Effectively, the known spacing between the pixels at the centers of the target lesions in the array may be used as a template which is superimposed on the stored array of computed $(SNR)_L$ values at each pixel in the target image. The template is then applied to an initial pixel location, generally at the upper left-hand corner of the expected area of the array, the values of all of the $(SNR)_L$ at each pixel location underlying the template are then averaged, and this value stored in correspondence with the initial pixel location at which the template was located, and then the template is moved over one pixel and the computation repeated. The template is then repeatedly moved and the computation repeated so that each pixel location in the template covers a sub-area corresponding to the known spacing between adjacent target lesions in each row and between adjacent target lesions between rows. This subarea should be of a minimum size and have a shape that guarantees that at least one pixel location at which $(SNR)_L$ is computed is within one pixel length of the center of a lesion in the image. For example, if the lesion centers form a square array one centimeter on a side, such a subarea would be a square one centimeter on a side. The resulting data that is stored in memory is then examined to find the maximum value of the added or averaged $(SNR)_L$, and with the pixel locations at which the template was positioned for the maximum value then corresponding to the best estimate of the pixels at the centers of the target spheres in the target array. If desired, the estimated pixel locations at the centers of the target spheres in the target image may be refined by doing a local search about each estimated center pixel location to find a local maximum (or minimum for negative contrast). Additionally, to account for slight misalignments between the scan head and the array of target spheres within the target image, resulting in the axis of symmetry of the image area not being parallel to columns of the centers of the lesions, the template may be rotated by slight amounts, e.g., in 1° increments, and the computation for pixel locations recalculated as set forth above. The particular rotational orientation of the template that yields the maximum average $(SNR)_L$ then will provide the best estimate of the orientation of the array of pixel locations in the target image.

After the best estimate of the locations of the pixels at the centers of the target spheres in the target image has been determined, the lesion $(SNR)_L$ values at these pixel locations (which have already been computed) are then used to compute mean lesion $(SNR)_L$ of the rows of target lesions in the phantom as a function of depth.

Alternatively, to somewhat reduce computer computation time, if desired, best estimates may first be computed of the pixel locations at the centers of target spheres within the target image, and the lesion signal-to-noise ratio $(SNR)_L$ computed only at these pixel locations. The digitized data corresponding to one of the background images is then preferably repeatedly smoothed to generate a smoothed, unweighted average background image. The smoothed background image may then be further processed to determine the minimum pixel value having a significant occurrence, followed by subtraction of the minimum significant pixel value from pixel values used in the smoothed background image and then setting values less than zero equal to zero. The resulting smoothed and subtracted background image may then be subtracted from each of the several (e.g., four) background images and the target image to provide adjusted images for further processing. Preferably, all of the background images may be averaged together and subtracted in the foregoing manner from the target image to form a subtracted work image. The computed $(SNR)_L$ at each target position may then be used as discussed above to find the mean signal-to-noise ration $(SNR)_L$ as discussed above as a function of the depth of the rows in the phantom or of contrast. The locating of the target spheres in the subtracted work image can be carried out by smoothing the subtracted work image using a kernel equal to or approximately equal to the target sphere size. The kernel may be either circular or rectangular. The result of the smoothing is an image in which each pixel represents an average of its surrounding pixels over an area equal to the sphere size. A computationally efficient process for locating the spheres may be carried out taking advantage of the fact that the target spheres should lie in known positions, e.g., regularly spaced columns and rows. Assuming that the first target is at the upper left-hand corner of the image within the usable area of the image, a column of data with this point as the initial index is placed into an array. The column of data may then be reindexed into another array so as to match the index with a specific grid location. Because the spacing between the centers of the target objects is known, the number of pixels, both horizontally and vertically, between the expected positions of centers of the target objects in the image is known. The index of the pixels in each column will repeat in a cyclic manner corresponding to the expected spacing (in pixels) of the centers of the target objects. The values in the pixels in the cyclically repeating pixel values in each column can be added and averaged, with the pixel index in the column at which the largest average occurs being the most probable y-origin for the target object for that column. The column is then moved one pixel over in the x direction and the process repeated until all columns of pixels corresponding to the expected spacing (in pixels) between adjacent target objects in a row has been covered. The pixel having the highest average value after the process is completed corresponds to the most probable location (origin) of the center of the actual target object. By locating the center of the first spherical target at the upper left-hand corner of the image, the location of all remaining target objects can be estimated because of the known spacing (in pixels) between target objects in the image. Preferably, after the expected positions of the target objects are determined, an area around the designated pixel is interrogated to locate a local maximum in the subtracted work image, if a unique local maximum pixel exists, to determine a more precise estimate of the center pixel of the target object.

After the pixels which correspond to the estimated positions of the centers of the target objects in the target image are located, the lesion signal-to-noise ratio $(SNR)_L$ is determined at these pixel locations using the known spherical target diameter. Alternatively, as noted above, the $(SNR)_L$ for each pixel may be computed first and the locations of the pixels at the estimated centers of the target spheres then located. In either case, the signal-to-noise $(SNR)_L$ may be computed as follows: On the target image the average pixel value $S_L$ is obtained for a preferably circular region with a size equal to the dimensions of a target sphere. Alternatively, an average pixel value in a square region corresponding to the dimensions of the spherical target may be utilized. The background level for the spherical targets is also measured, using the target image, as the average of the pixels in an area centered on a target sphere which is larger than the circular projection of the target sphere, but does not include pixels from within the target area. The area used in computing the background level should be larger than that of the target circle (e.g., 2.5 times the circular projection of the target sphere), but does not include pixels corresponding to any target sphere. The average for this region, $S_B$, is then subtracted from $S_L$ to provide a signal level value. The noise value is determined from the (e.g. four) background images. An area is centered over the position of each sphere on the background image (e.g., an area of size equal to 2.5 times the spherical target size), this area is divided into sub-areas, and the average pixel value within each sub-area is calculated. The noise value associated with all sub-areas is utilized to determine the standard deviation, which may be approximated by the standard error for the ensemble of the sub-areas. The noise value is calculated independently for the positions of all spheres on each background image. The average noise value for each of the backgrounds is then averaged together (root-mean-square) for each spherical target location. An alternative and probably slightly better way to compute the standard deviation or standard error for a given target position is to consider all subareas for the four background images corresponding to that target location without determining standard deviations or standard errors for each background image first.

The $(SNR)_L$ at each target location is then given by $(SNR)_L = (S_L - S_B)/\sigma_{MB}$, where "$\sigma_{MB}$" represents the average noise for all background images at a given target sphere location.

The mean signal-to-noise ratio $(SNR)_{ML}$ may then be displayed for each row of spheres (i.e., spheres at equal depths in the phantom). If desired, the maximum and minimum $(SNR)_L$s in each row may be displayed, as well as $(SNR)_{ML}$ as a function of the known contrasts between the target spheres and the background to allow the deviations along each row to be observed to determine if the average has been skewed by any single SNR value.

Two thresholds for detectability can be established by human observer tests preferably using the two-alternative-forced-choice (TAFC) method by setting the thresholds so that TAFC thresholds correspond to the automated system thresholds. For negative contrast lesions, if $(SNR)_{ML}$ for targets at some depth is less than (more negative than) a negative threshold number, then the lesions at that depth would be considered detected. Conversely, if $(SNR)_{ML}$ for positive contrast lesions at a given depth is greater than a positive threshold value, then the lesions at that depth would be considered detected.

Given a scanner configuration—including scanner make and model and serial number, scan head make, model and serial number, depth of image field, focus depth(s), gain settings, etc.—there will be minimum and maximum depths where lesions are detected in the target image for each sphere diameter and contrast. The depth range between the minimum and maximum depths is called the resolution zone for a particular sphere diameter and contrast. The knowledge of resolution zones for each sphere diameter and contrast constitute the performance information which can be used by clinical personnel to specify the performance level of a scanner configuration, either for comparing with performance levels from past determinations or for comparison with performance levels may influence the choice of a scanner configuration for a particular clinical task. One task might be breast imaging with high detail expected at shallow depths and another task might be imaging lesions at the 15 cm depth range in the liver.

The present invention can be applied to ultrasound scan images in either rectangular format or sector format. Where scan images are obtained in a sector format from the ultrasound scanner, further preprocessing of the target and background images may be performed to define the image frame within which the images of the target object array in the ultrasound phantom may be located.

Further objects, features and advantages will be apparent from the following detailed description when taken in conjunction with the accompanying drawings.

BRIEF DESCRIPTION OF THE DRAWINGS

In the drawings:

FIG. 19 is an illustrative view showing the manner in which the subtracted image is averaged over an area representing the size of the target spheres.

FIG. 20 is a view illustrating the results of the averaging of the image in accordance with the averaging process illustrated in FIG. 19.

FIG. 21 is an illustrative view showing the manner in which columns of data and array indices for grids located at specific x-coordinates are determined.

FIG. 22 is an illustrative view as in FIG. 21 illustrating the positions of the scanning grids in the x direction for the last pass.

DETAILED DESCRIPTION OF THE INVENTION

Figure 1:
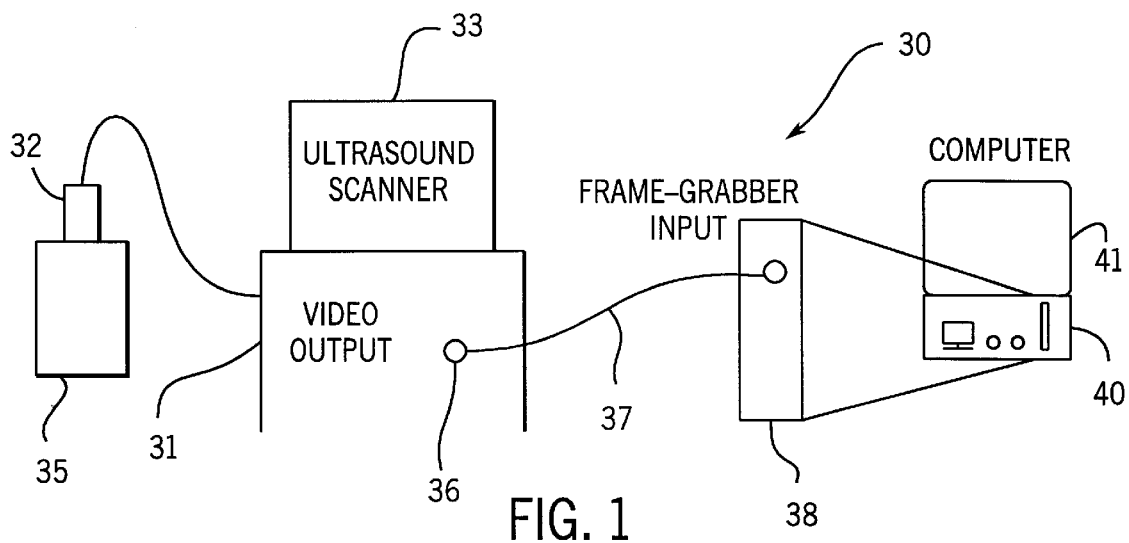
FIG. 1 is a schematic view of an automated system for testing the resolution of medical imagers in accordance with the invention.

With reference to the drawings, a schematic diagram of an automated system for testing the resolution capability of a medical imager such as an ultrasound scanner is shown generally at 30 in FIG. 1. The system 30 is used in conjunction with a commercially available imager, for example, an ultrasound scanner 31 having a scanning head 32 and, typically, a display screen 33. The scanning head 32 is applied to a standardized ultrasound phantom 35 to acquire video frames in a conventional manner by the ultrasound scanner 31. The video signal generated by the ultrasound scanner 31 is made available by the scanner 31 at a video output port 36, and this signal is supplied via a cable 37 to a digitizer and frame grabber unit 38. The frame grabber 38 provides its output to a computer 40 which can display results, for example, on a video display screen 41, or provide output signals to other display devices, such as printers, or to computer networks. Commercially available hardware may be utilized for the digitizer and frame grabber 38 (e.g. Data Translation 2255) and for the computer 40 (e.g. Power Macintosh, Models 7500/80 and 9500/200, from Apple Computer). The computer 40, with ancillary on-line and off-line memory is capable of storing in a conventional fashion and retrieving the digitized background and target image data.

Figure 2:
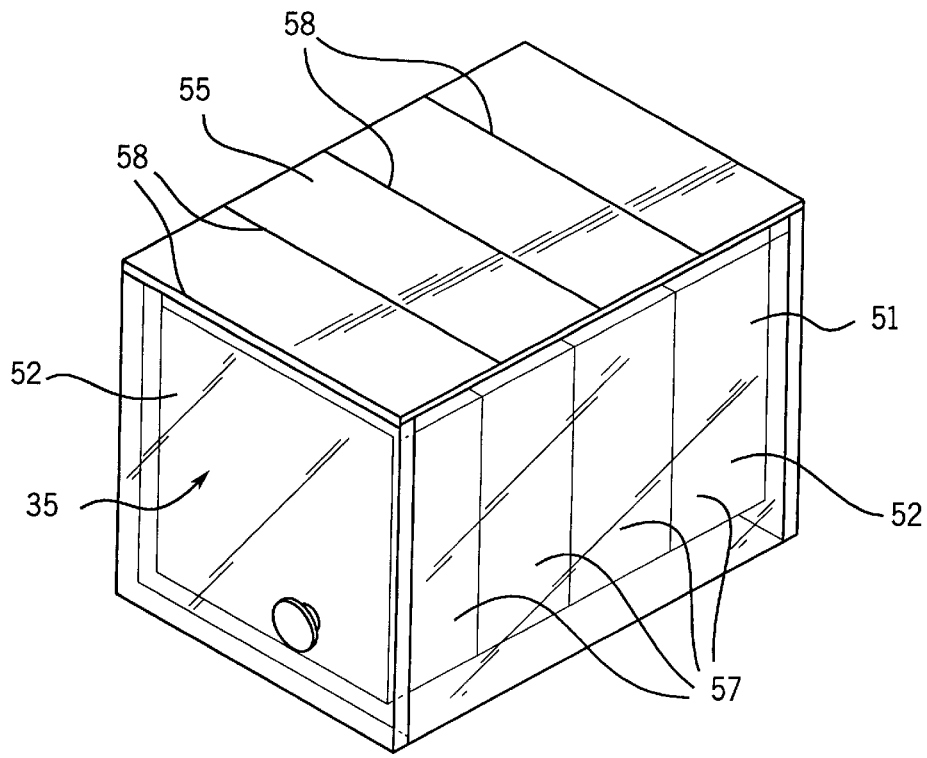
FIG. 2 is a perspective view of an ultrasound phantom of the type with which the present invention may be used.
Figure 16:
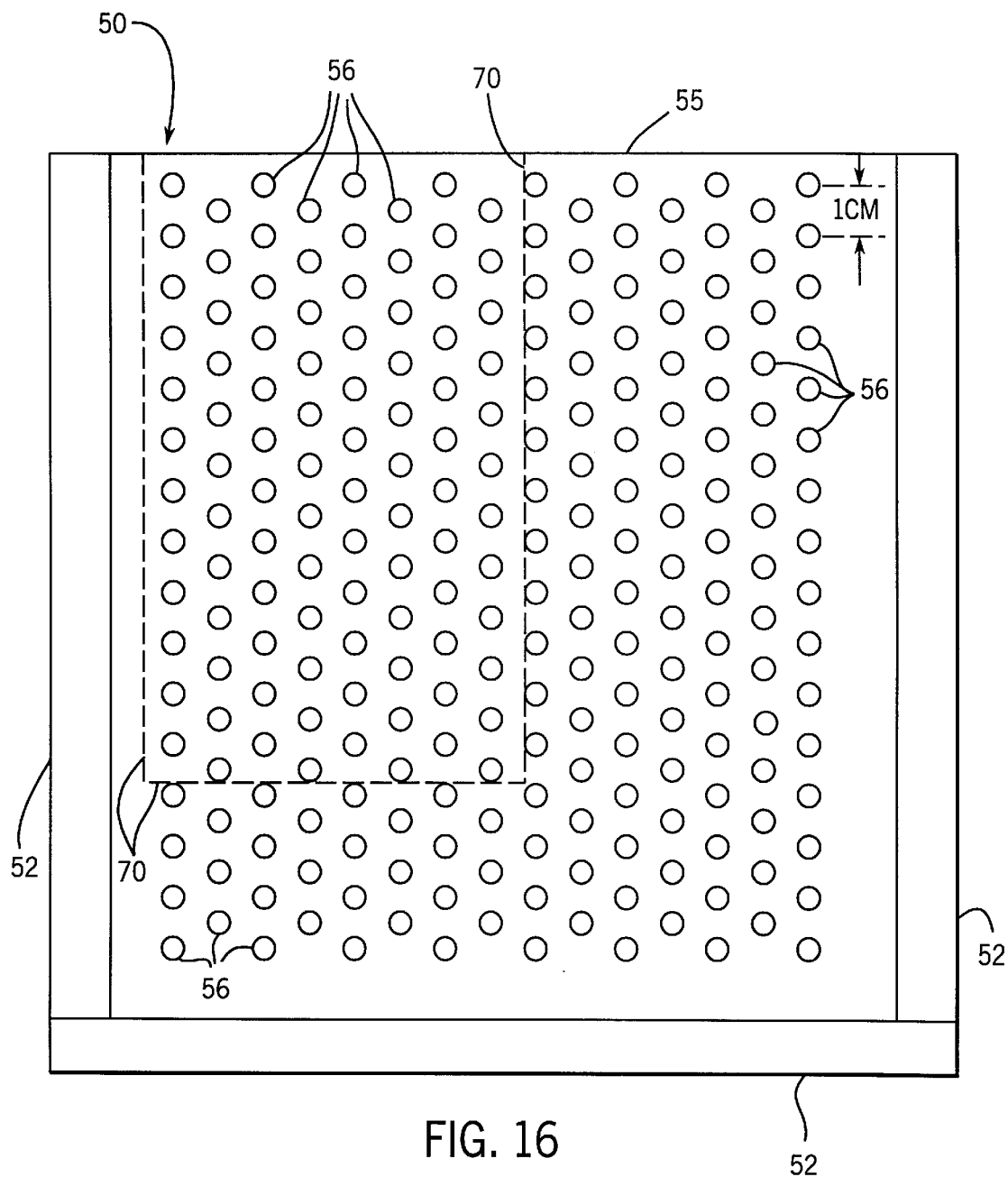
FIG. 16 is a schematic view showing the array or target spheres in a phantom and illustrating the limit of an image which is laterally displaced with respect to the array.
Figure 17:
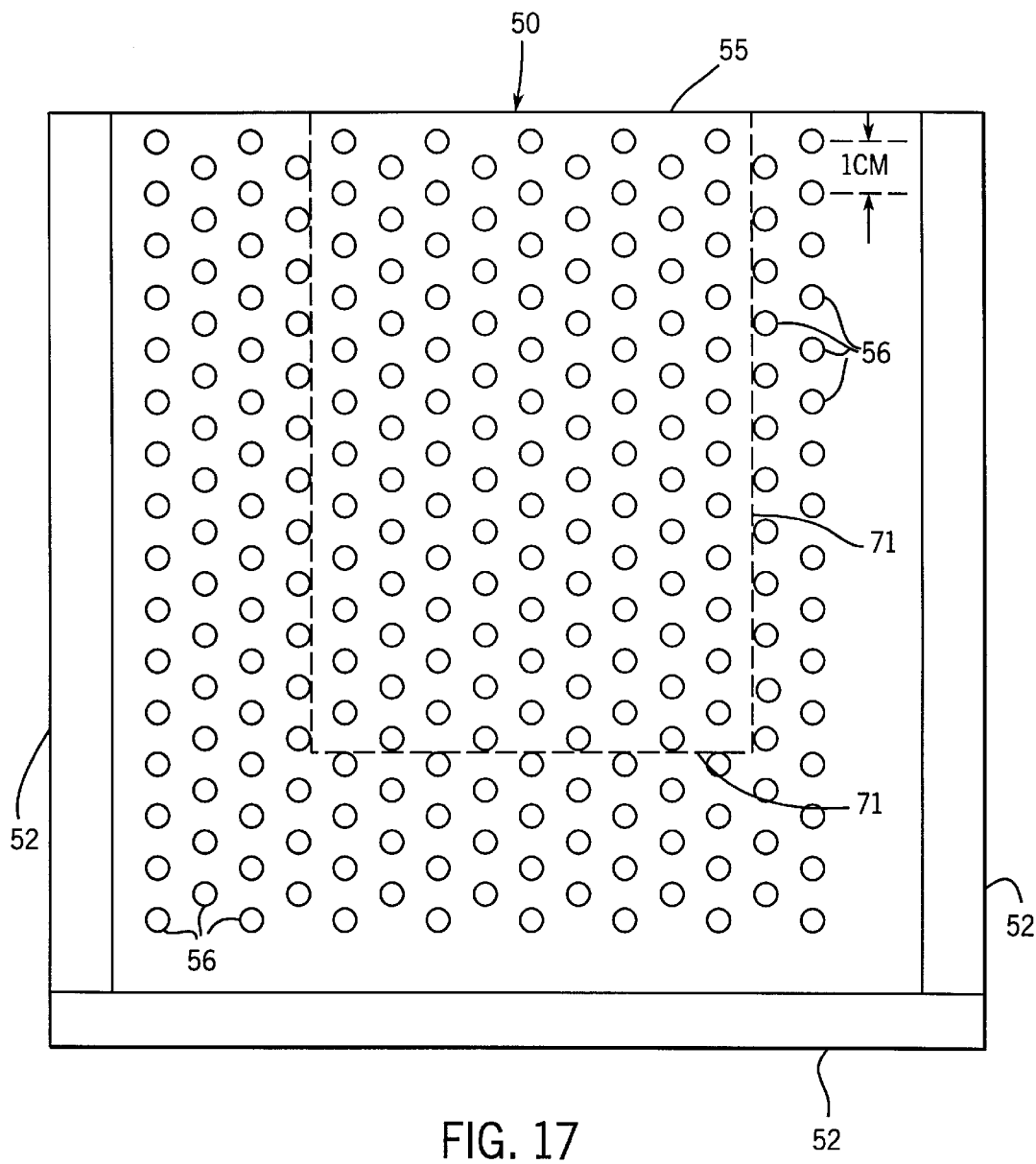
FIG. 17 is a schematic view showing the array of target spheres in a phantom and illustrating the limit of an image which is properly located with respect to the array.
Figure 18:
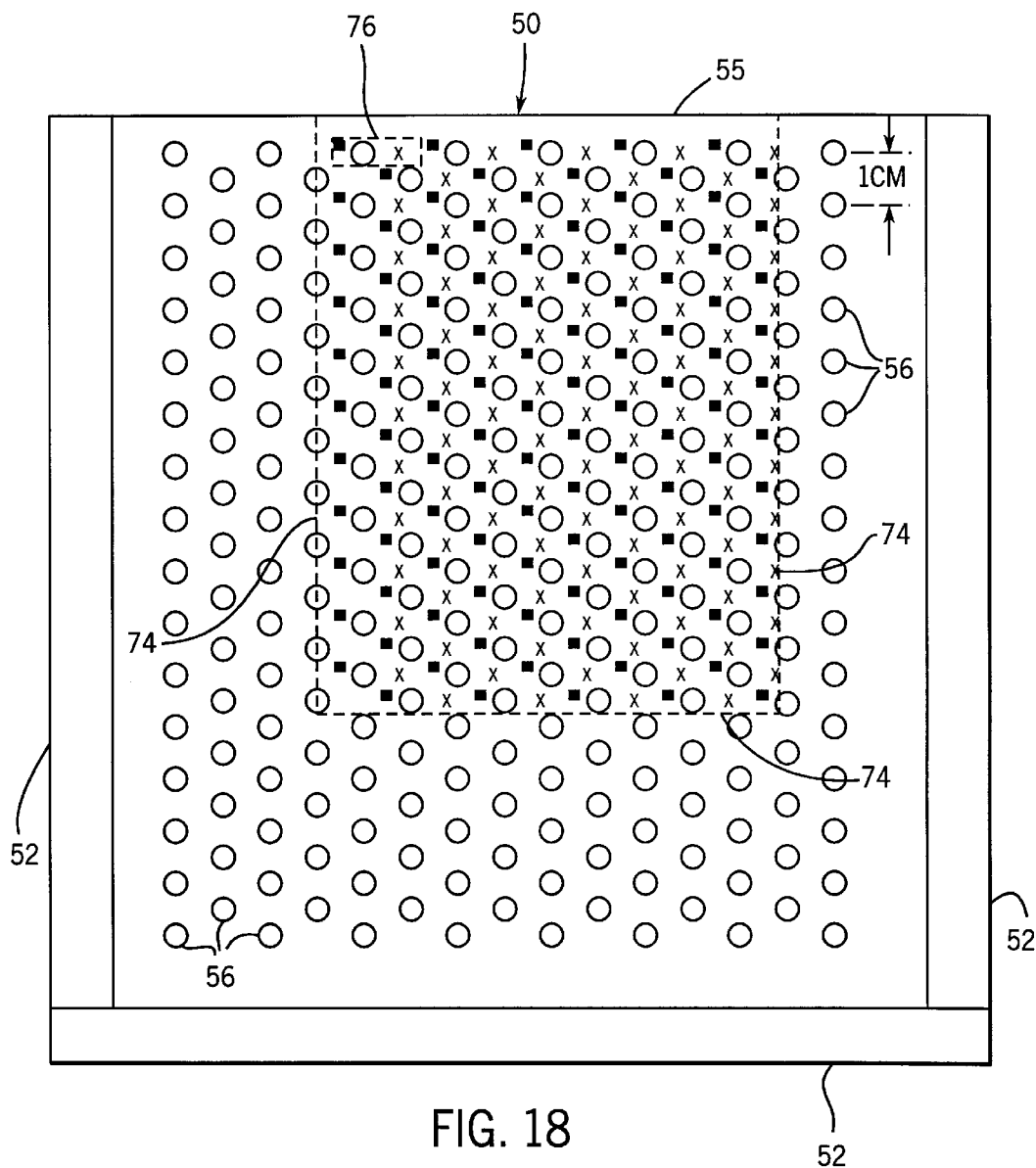
FIG. 18 is a schematic view showing the array of target spheres in a phantom and illustrating two examples of sets of pixel locations at which mean signal-to-noise ratios $(SNR)_L$ and computed in the process of locating the target spheres.

In carrying out the present invention, the ultrasound phantom 35 is constructed so that the positions of simulated lesions, formed as spheres, have precisely known spacing of the spheres in a coplanar array of spheres, as well as known diameters for the spheres in each of what may be several sets of spheres. For purposes of illustration, an external view of an ultrasound phantom 50 is shown in FIG. 2. The phantom 50 has a box-like outer container 51 formed of rectangular side walls and bottom walls 52 (e.g., formed of clear plastic) and an ultrasound transmitting window 55. The interior of the container 51 is filled with the tissue mimicking gel material and with sets of spherical target lesions 56 with coplanar centers, as illustrated in FIGS. 16–18, which may be formed of a material which differs from the surrounding body of the phantom in terms of attenuation and/or scatter coefficients. The phantom 50, the body of the tissue mimicking material within the phantom, and the spherical target lesions may be formed as described in the prior U.S. patent to Madsen, et al., U.S. Pat. No. 5,574,212, the disclosure of which is incorporated herein by reference. As described in the aforesaid patent, the spherical lesions are formed in one or more sets of coplanar arrays of spherical target objects 56 which simulate lesions in the background materials. The phantom may be divided into several sections 57, each containing spherical target objects 56 that differ in diameter or ultrasound characteristics or both from the target objects in other sections. Preferably, at least one of the sections 57 contains no target lesions and only background material. Lines 58 may be formed on the window cover 55 to identify to the user of the plane in which lie the centers of an array of spherical target objects. The formation of exemplary phantoms and the material for the body of the phantom and spherical targets may be formed in accordance with well known techniques, for example, as described in the prior patents to Madsen, et al., U.S. Pat. Nos. 4,277,367 and 4,843,866 and 5,625,137.

A variation of the technique for producing phantoms in accordance with the foregoing patents may be utilized to provide very precisely positioned arrays of spherical objects of known spacing and diameter, which is significant in the utilization of the present invention. An exemplary method of construction of the phantom is the following.

A container with flat walls, one of which has semi-spherical protrusions corresponding to the size and shape of the spherical target lesions, is filled with molten "background" material, and the background material is allowed to solidify. Spherical target lesions, particularly spheres having compositions differing from the background material in ultrasonic properties, such as the type described in U.S. Pat. Nos. 4,883,866 and 5,574,212, are separately produced in molds by filling the molds with molten gel and allowing the spherical target lesions to solidify, and thereafter removing the solidified targets from the molds. The wall of the container which has the protrusions extending therefrom is then removed from the container, leaving a gel surface with spherically surfaced indentations, or sockets, greater than hemispheres, but not complete spheres, therein corresponding to the intended positions of the spherical target objects. These target objects are then inserted into the indentations in the gel thereby precisely fixing them in the proper positions. Another section of the container is then assembled to the container to provide a void over the target objects, and is secured in place, and the void volume is then filled with additional background material which is then allowed to congeal and solidify. It is desirable that the steps of inserting the target objects in the sockets in the first solidified gel, and then assembling the rest of the container and filling the remainder of the container with background material, be performed as quickly as possible so that the gel components of the phantom are depleted of dissolved air. Any small pockets of air which have not been dissolved in the gel will generally then be dissolved over a period of time.

The placement of the target objects within the gel can be made as precise as the positioning of the protrusions from the removable wall of the container, that is, to the limits of the precision of the mounting of the protrusions into the side of the removable container wall. The size (diameter) of the spherical target objects can be closely controlled using the molds by which the target objects are formed, so that the resulting phantom has coplanar arrays of target spheres which lie in a regular array with known and generally uniform spacing between the centers of each of the spherical target objects.

Phantoms with a regular array of spheres with coplanar centers can similarly be made for MRI or CT imagers in the same fashion used to produce the ultrasound phantom. Materials with various contrasts relative to the background have been produced and formed into phantoms for MRI including exact positioning of spheres with coplanar centers. See, E. L. Madsen, et al., "Low-contrast focal lesion detectability phantom for $^1$H MR imaging," supra; and U.S. Pat. No. 5,312,755, which describes suitable materials for MRI phantoms. For CT imagers, variations in contrast can be accomplished through variations (between sphere material and background material) in volume fraction of uniformly suspended powdered graphite, microscopic glass beads or microscopic droplets of emulsified oil in solid gelatin or agar, as described in E. L. Madsen, et al., "Tissue-mimicking materials for ultrasound phantoms," supra; M. M. Burlew, et al., "A new ultrasound tissue-equivalent material," supra; T. M. Burke, et al., "X-ray linear attenuation coefficients in the mammographic range for ultrasonic breast phantom materials," supra; and E. L. Madsen, et al., "Oil-in-gelatin dispersions for use as ultrasonically tissue-mimicking materials," Ultrasound in Med. & Biol. 8, 277–287 (1982). The parameter varied is the effective atomic number.

Using such phantoms, frame-grabbed images are obtained with the midplane of the CT or MRI slice superimposed on the plane containing the sphere centers. Frame-grabbed images in a region of the phantom not containing target spheres (background images) are also obtained.

Exact positioning of the spheres in the phantoms allows the same procedures for locating the centers of the targets in the target image used for ultrasound to be employed in CT or MRI. After determining the locations of the targets in the target image, $(SNR)_L$ values can be computed centered at each target.

In ultrasound, $(SNR)_{ML}$ is then computed for specific depths or depth intervals. Any appropriate analogous set of $(SNR)_L$'s may be used; e.g., for both MRI and CT the target image may be segmented (mathematically) into equal width annular rings with width, e.g., 1 cm. $(SNR)_{ML}$ for any annular ring would equal the mean of the $(SNR)_L$'s contained in that ring.

Two alternative forced choice (TAFC) methods for human observers and automation may be used to establish detection thresholds on $(SNR)_L$'s and $(SNR)_{ML}$'s. Also, both positive and negative contrasts can be utilized for both CT and MRI.

In carrying out the present invention to test the performance of the ultrasound scanner 31, the operator places the scanner head 32 in various positions on the window 55 of the phantom 35 to capture a scan of the phantom. As explained further below, the scans will typically be done by placing the scanning head on one of the lines 58 to center the scanning head so that the scan slice coincides with the plane of an array of target objects or to the background material where no target objects are located. Generally, the operator will orient the scanning head 32 over one of the lines 58 aimed at a target array, view the ultrasound scan video on the display 33, and adjust the position of the scanning head 32 so that it is directly over the center line of the plane of the array and is projecting an ultrasound beam parallel to the plane of the array. The processing of the images obtained from each scan is carried out under the control of software in the computer 40, using the video output signal from the ultrasound scanner 31 as processed by the frame grabber 38, and utilizing data inputted from the operator to the computer 40 indicative of the diameter and spacing of the spherical target objects in the array over which the operator has positioned the scanning head 32, or, where the operator has positioned the scanning head over background material, indicative of the fact that a background image is being scanned and not target objects.

In the description of the analysis of the images from the ultrasound scanner set forth below, the following definitions, with reference to the views of FIG. 3 (for a rectangular format scan) and FIG. 4 (for a sector format scan), are used.

Ultrasound Scan Image: the entire ultrasound image as presented by the scanner, including the diagnostic component as well as the areas containing scanner generated text and user annotation.

Diagnostic Component: the portion of the ultrasound scan image that contains information regarding the echo amplitudes.

Image Backboard: the portion of the ultrasound scan image that does not contain any diagnostic component.

Target Image: the ultrasound scan image or the diagnostic component that was acquired with the spherical lesion targets within the field-of-view of the ultrasound scanner head.

Background Image: the ultrasound scan image or the diagnostic component that is acquired from the scan head positioned with only phantom background material in the field-of-view of the scan head.

Figure 3:
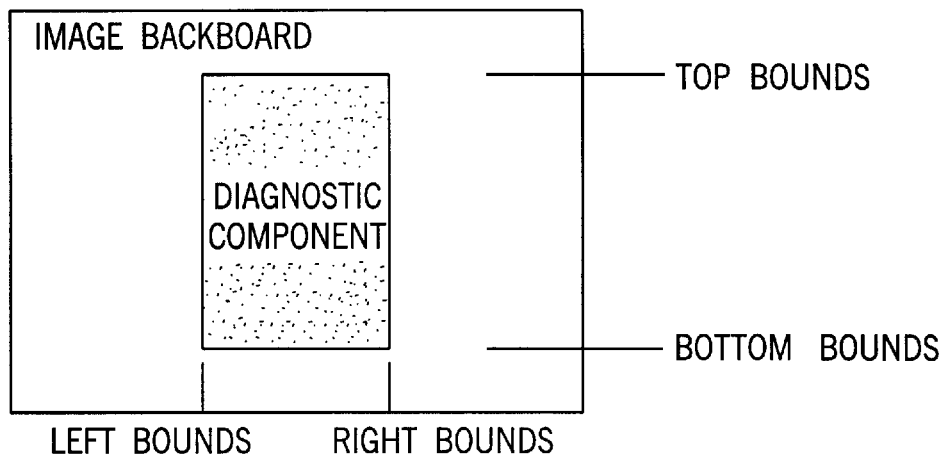
FIG. 3 is a schematic view showing a rectangular format for an ultrasound scan image.
Figure 4:
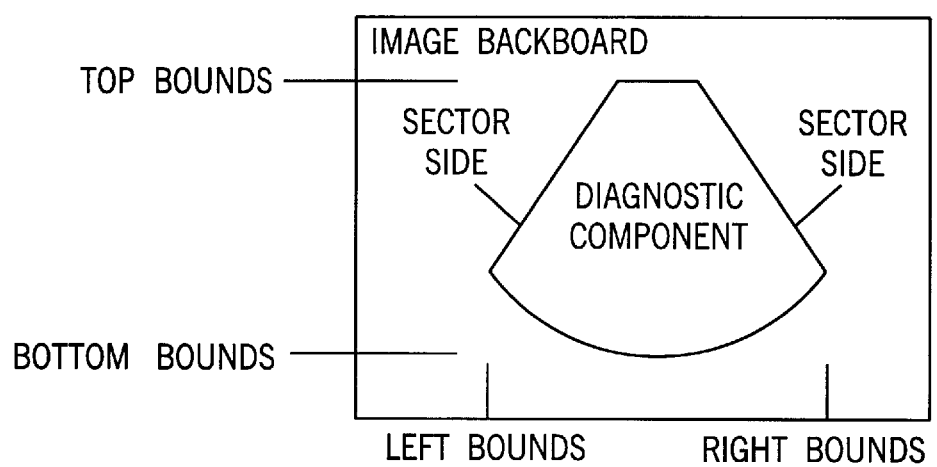
FIG. 4 is a schematic view illustrating a sector format for an ultrasound scan image.

FIGS. 3 and 4 also illustrate the bounds of the diagnostic components for the rectangular format and the sector format, respectively.

In accordance with the present invention, the automated ultrasound scanner testing system carries out the functions of isolating the image component (diagnostic component) of the ultrasound scan image, locating the positions of the target object spheres, measuring the lesion signal-to-noise ratio $(SNR)_L$ of the target objects with respect to the background, and presenting the results in a form usable to the operator. Each of these functions is described in further detail below.

Isolating the Diagnostic Component of the Ultrasound Scan

A first step consists of averaging several (e.g. four) backgrounds and subtracting the resulting image from the target image. The subtraction is performed by taking the absolute value of the difference of each target pixel minus the corresponding pixel on the background image. The primary reason for the subtraction is remove (set to zero) pixels on the target image that compose the backboard. Additionally, text and annotation that is identical on all images will be set to zero. The absolute value of the subtraction is used to enhance, or fill-in, the diagnostic component on the subtracted image. The resulting subtracted image will be referred to as the "First Subtracted Work Image." This image will be used for the remainder of the operations involved in isolating the diagnostic component.

Some general characteristics of the First Subtracted Work Image are summarized as follows:

1) The image backboard component should be almost entirely comprised of zeros. Pixels within this region that are non-zero may result from user annotation, frame-grabber noise, or a time stamp placed on the image by the scanner.

2) The diagnostic component will be almost entirely non-zero. A pixel value of zero within the diagnostic component will result only if the pixel value on the target image is identical to the average of the pixels on all four backgrounds corresponding to the same spatial location.

3) Generally all of the pixels will contain low values, with essentially no pixels being at the maximum value (e.g., 255).

Figure 5:
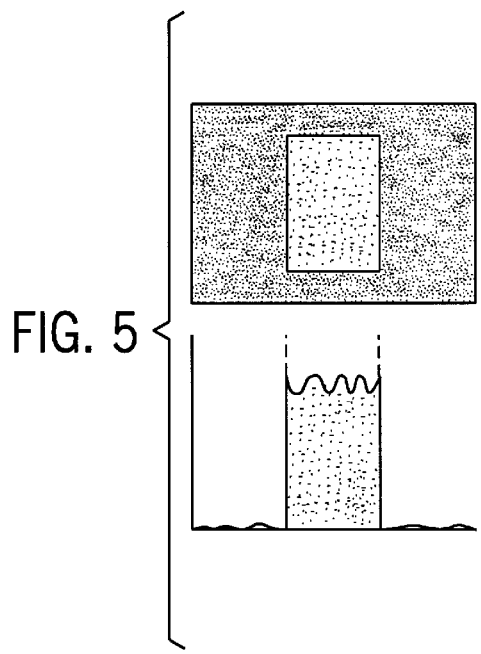
FIG. 5 is a schematic view illustrating a spatial histogram technique for determining the left and right boundaries of the diagnostic component of a rectangular format ultrasound scan image.
Figure 6:
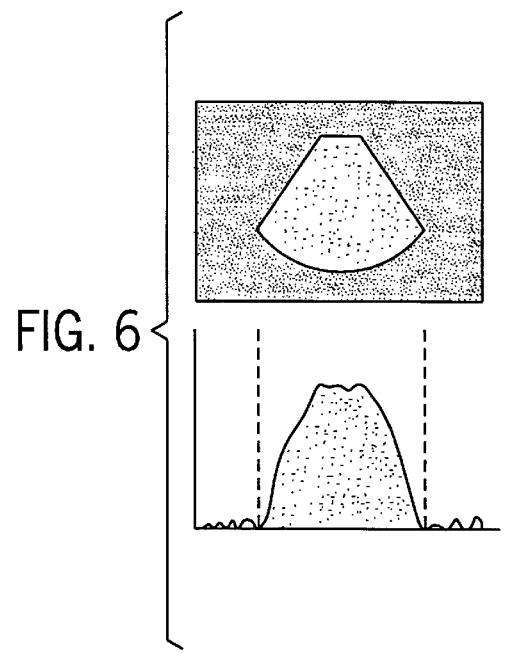
FIG. 6 is a schematic view illustrating a spatial histogram technique for determining the left and right boundaries of the diagnostic component of a sector format ultrasound scan image.

Using the First Subtracted Work Image, the number of non-zero pixels in each column are summed. This provides a spatial histogram in the x-direction, as illustrated in FIG. 5 for a rectangular format image and in FIG. 6 for a sector format image.

From the histogram data, the endpoints of the largest area under the curve are determined. These points correspond to the left and right boundaries of the diagnostic component (see FIGS. 3 and 4). Additionally, the rate of increase of the largest area is used to determine the image format (rectangular or sector). Note that for the sector scan format, the left and right boundaries are only an approximation because the sector tapers off to only a few pixels—therefore the exact boundary may not be accurately determined at this time. Additionally, the wide field of view of the sector format may result in a "truncated" image if the phantom is not sufficiently wide to contain the entire field of view. In this case, the left and right boundaries would be in error but the approximation would remain valid for the next steps. A similar procedure is then performed in the horizontal direction, yielding the upper and lower boundaries of the diagnostic component (see FIGS. 3 and 4).

Figure 7:
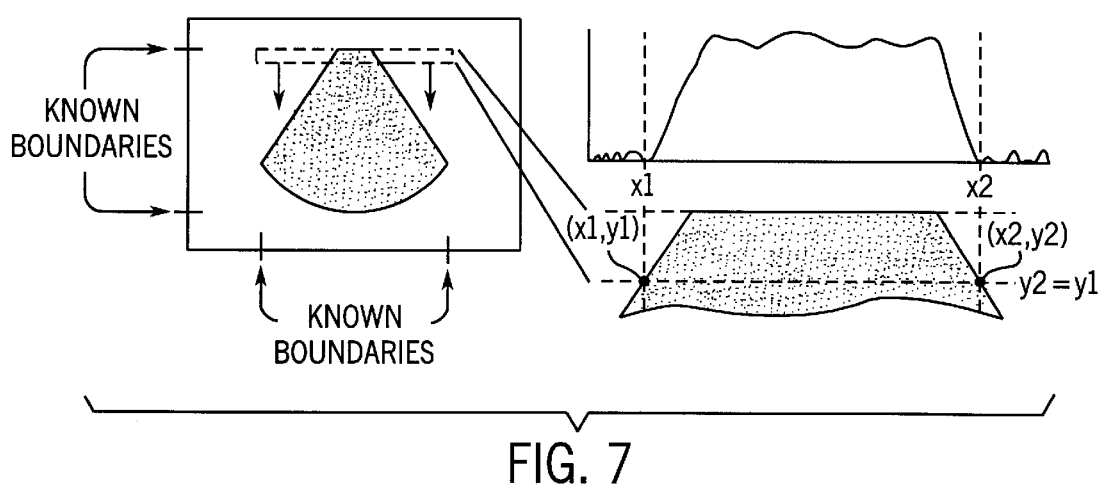
FIG. 7 is a schematic view illustrating a spatial histogram technique applied, in increments, over a region of the image for a sector format display.

If the scan format has been determined to be rectangular, the diagnostic component isolation algorithm is completed. If the diagnostic component is a sector format, the bounding arc and sides must be determined. Locating the sides is accomplished in a similar manner to finding the left and right bounds. However, instead of using the entire image, a smaller rectangular region is used, as illustrated in FIG. 7. The region extends from the left to right boundary and is, e.g., approximately 30 pixels high. The upper coordinates of the rectangle are identical to the previously determined upper boundary of the diagnostic component. Histogram data is obtained for columns of pixels within the small rectangle, and left and right boundaries are determined. These boundaries represent points along the sides of the sector. The rectangle is then incremented axially down the image and a histogram is generated for each increment—each yielding two points along the side of the sector (one point corresponding the left side, the other to the right side). Upon completion of the incrementation, separate linear curve-fits are applied to the left and right side data points to obtain the slope of each side of the sector. The set with the best correlation coefficient is considered to be the most accurate and therefore the corresponding slope is assigned to both sets (the negative slope is used for the set with the less optimal correlation coefficient).

Once the slopes of the sector sides have been determined, the boundary must be optimized. This is necessary because the edges of the sector (on the First Subtracted Work Image) can appear jagged due to pixelation. Also, the spatial histogram technique is somewhat sensitive to noise on the edges of the sector boundary, and consequently the calculated location of the edge may be biased in the x-direction.

Figure 8:
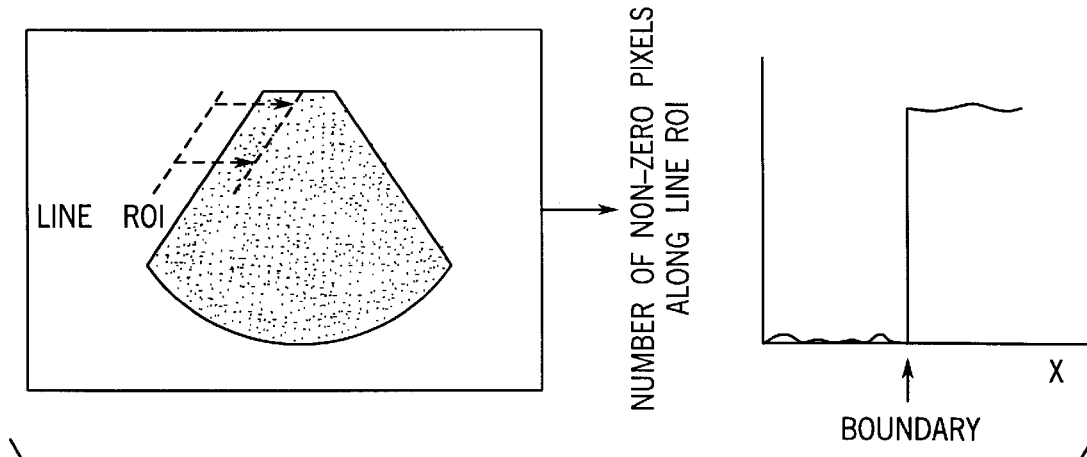
FIG. 8 is a schematic view illustrating optimization of the location of the side of a sector image.

To optimize the location of the sector side, a line region-of-interest (ROI) is used—the slope of which has been determined in the previous step. The line is scanned across the boundary and the number of non-zero pixels on the line are stored as a function of the x-location as illustrated in FIG. 8. This technique is identical to the spatial histogram technique with the exception that the data is obtained from an angled line and not from rows or columns. Since pixels may not necessarily lie directly on the line, bi-linear interpolation is necessary. The spatial histogram provides the x-coordinate corresponding to where the line ROI is superimposed over the border of the sector side. Since the slope is known, the entire line has been defined. The process is repeated for the remaining side of the sector.

Figure 9:
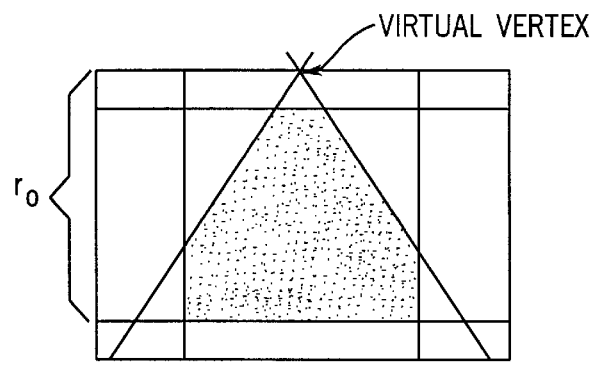
FIG. 9 is a schematic view illustrating the calculated boundaries of a sector image.
Figure 10:
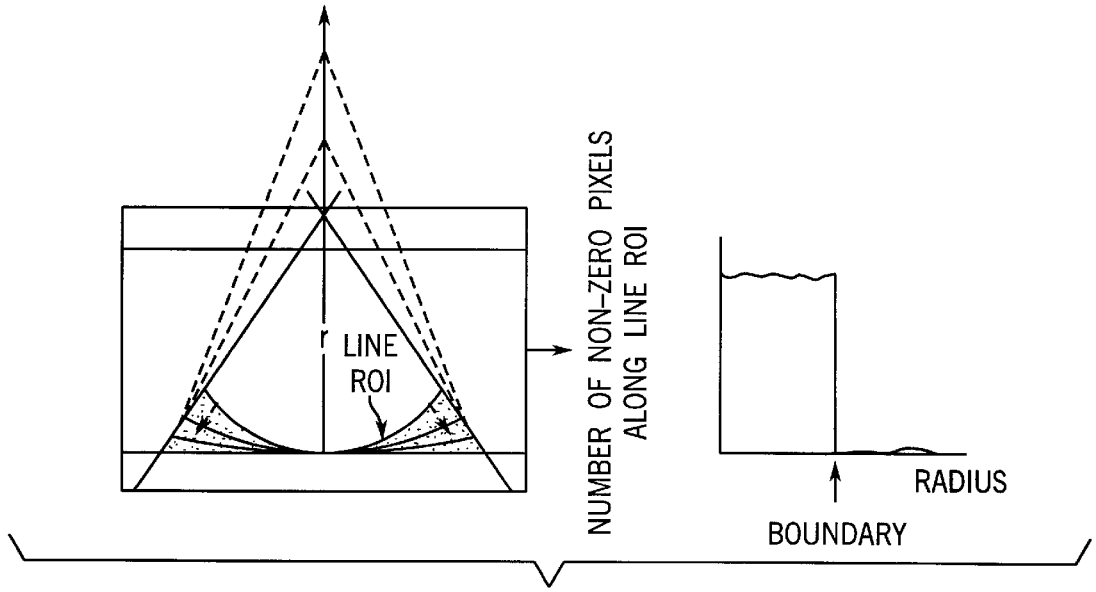
FIG. 10 is a schematic view illustrating the procedure for determining the arc at the base of a sector format image.
Figure 11:
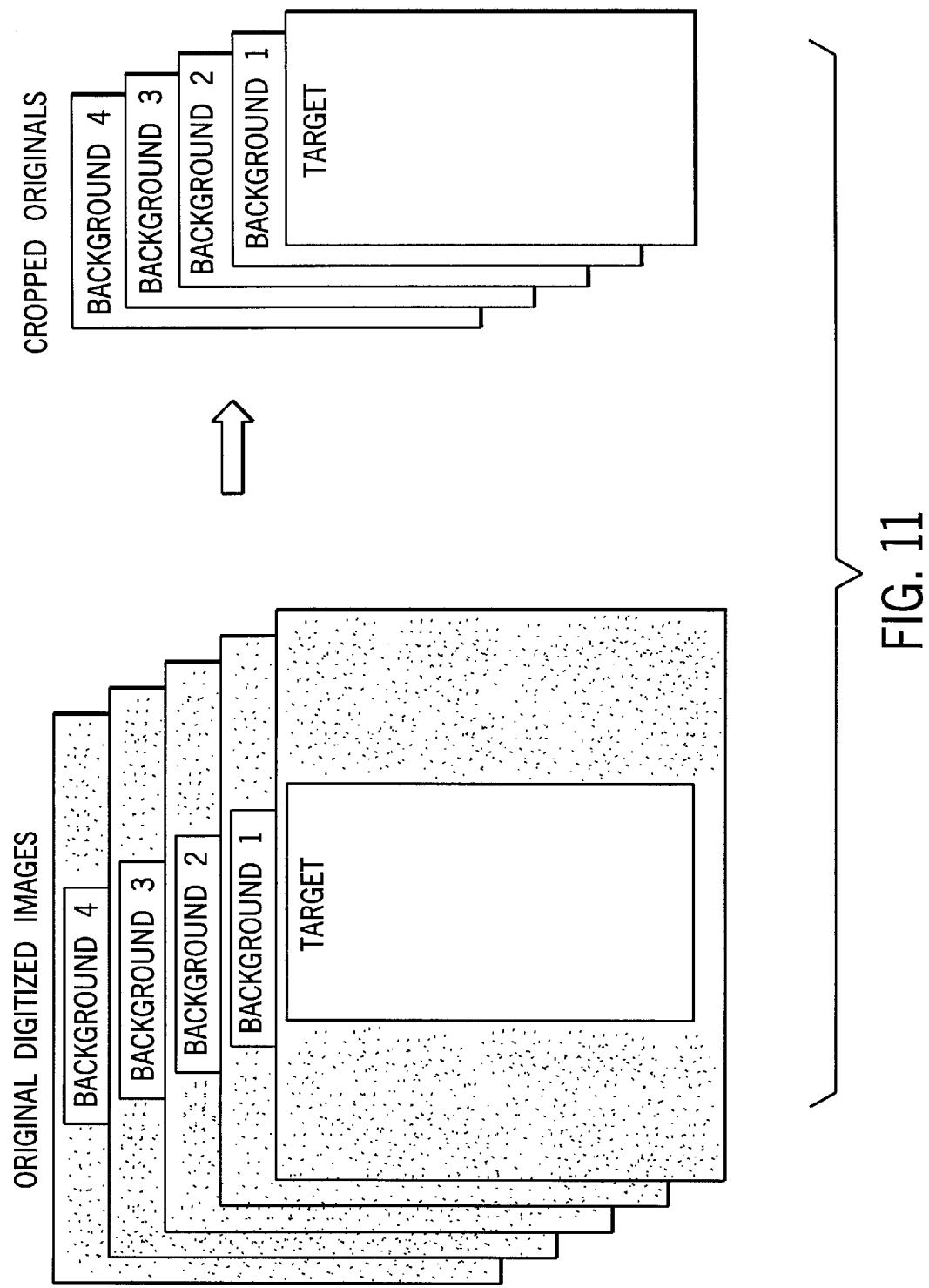
FIG. 11 is a schematic view illustrating the manner in which ultrasound image scans are cropped to define the useful image area in rectangular scanned images.
Figure 12:
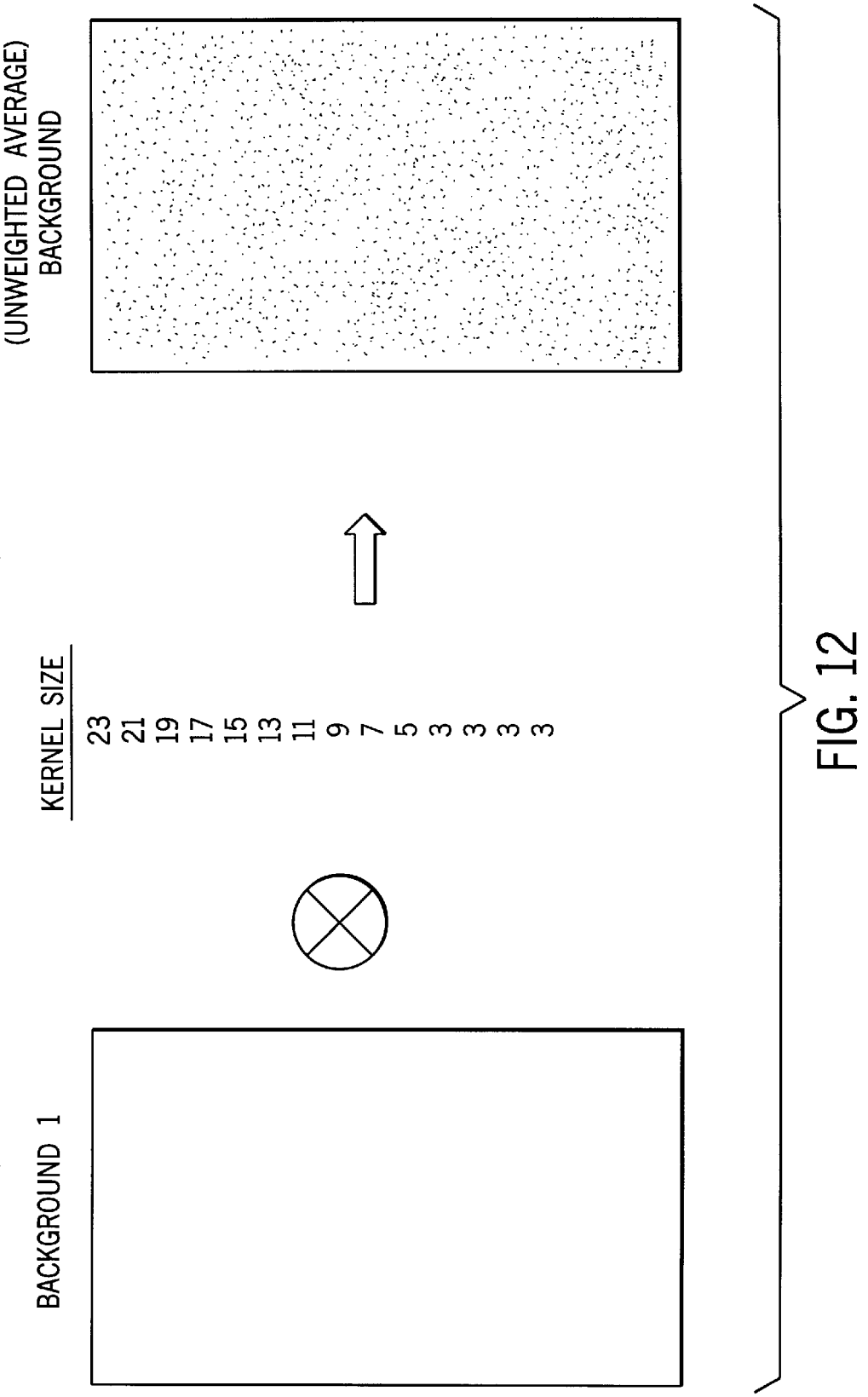
FIG. 12 is a schematic view illustrating the smoothing of one of the background images.
Figure 13:
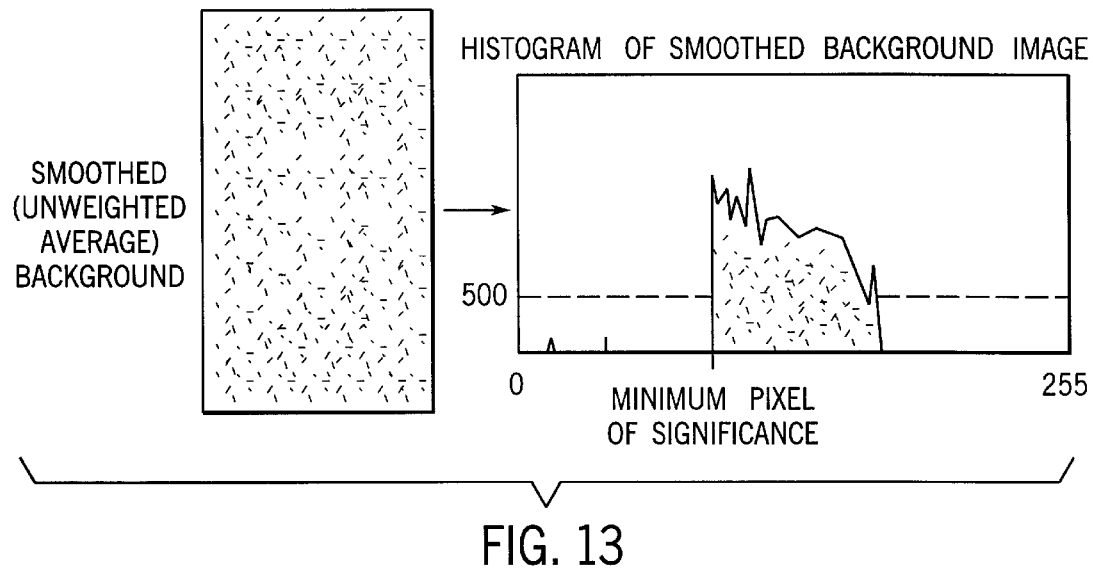
FIG. 13 is an illustrative view showing the manner in which a histogram is used to determine the maximum pixel value of significant occurrence with regard to the smoothed background image.
Figure 14:
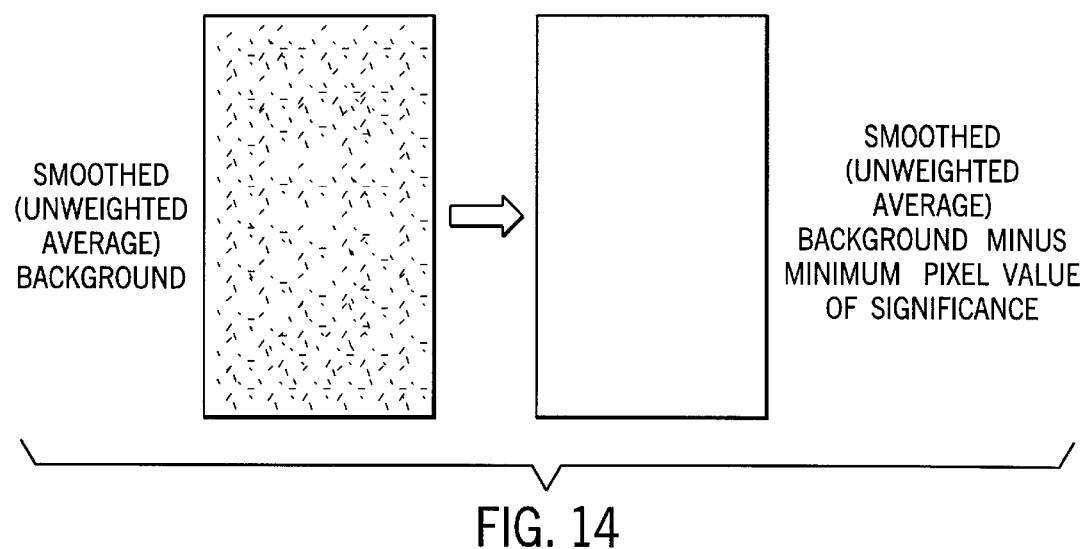
FIG. 14 is a schematic view illustrating the manner in which the background image is adjusted by subtracting the minimum significant pixel value.
Figure 15:
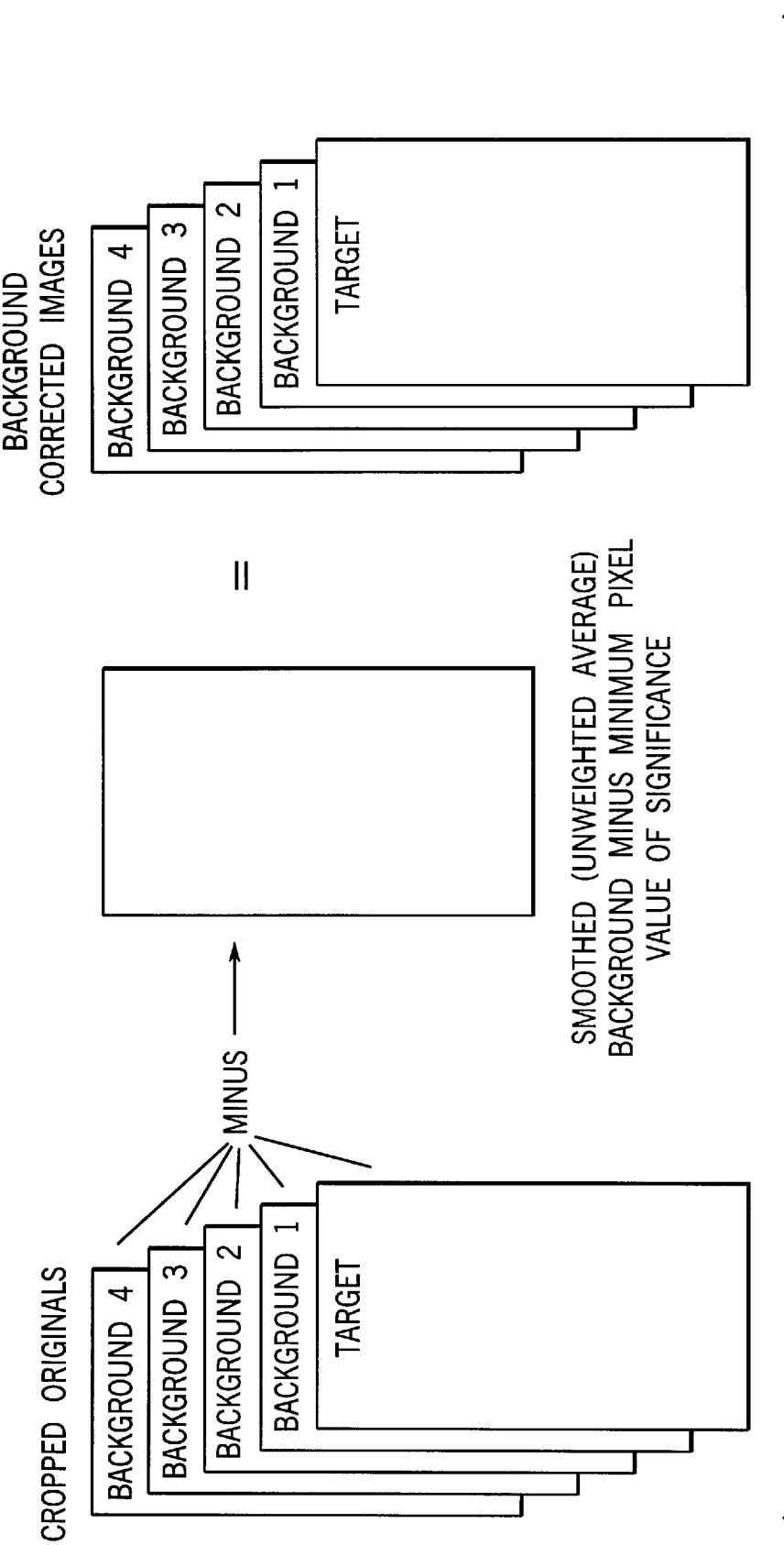
FIG. 15 are illustrative views showing the manner in which the smoothed and subtracted background image is subtracted from all five images.

All of the boundaries of the sector have been determined with the exception of the arc, as illustrated in FIG. 9. It is noted that the left and right bounds represent only an approximation. However, since both the base of the sector and the sector sides have been previously determined, they will be used to calculate the arc. As a first approximation, the arc is assumed to belong to the circle centered at the intersection of the two sector sides and of radius $r_0$ ($r_0$=y-coordinate of the intersection minus the y-coordinate of the bottom bounds). Next, the radius of curvature of the arc is determined from the first approximation. Starting with a radius of curvature slightly less than the first approximation, the radius of curvature is incremented in steps, while the base at the center remains at a fixed location, as shown in FIG. 10. This is identical to sliding the vertex upwards. (Note that the starting radius for the scanning is chosen to be slightly less than the first approximation for the radius of curvature to assure that the scanning line will cross the arc boundary even in situations where the first approximation is exact.) At each step, the number of non-zero pixels are counted along the line of the arc, and a histogram is generated. From the histogram, the radius of curvature can be determined (see FIG. 10). Since the radius of curvature and the sides of the sector are both known, the left and right bounds can be calculated and the sector is completely described.

As previously mentioned, the sector format is subject to truncation of the left and right boundaries caused by the phantom being too small to accommodate the entire field-of-view. This may invalidate some areas of the diagnostic component because the target or corresponding background regions may not contain phantom echo information. Consequently, any signal-to-noise measurements would be erroneous in these areas. Therefore, a minimum region must be determined that encompasses only pixels that contain phantom echo information and are common to all images. That is, each valid pixel on the target image must have corresponding valid pixel on every background image.

Since the phantom cut-off manifests itself as a truncation of the image on the left and right sides of the sector, the technique used to approximate the left and right bounds can be applied. This technique is considered to be an approximation only because it is not extremely sensitive for finding the "corners" of the sector. However, if the corners are truncated, the technique becomes more robust because the spatial histogram will show a sharper increase in the number of non-zero pixels as the boundary is traversed. The technique is applied to all four background images to the target image. Once the entire valid diagnostic component has been determined, the location of the sphere matrix can be determined.

A basic assumption is that in the phantom the centers of the target lesions are coplanar and that their relative positions are known; thus, an array of positions is defined. It is also assumed that the lateral limits of the region in the phantom containing the spheres 51 are not a factor in the result; thus, placement of the image frame as shown by dashed lines 70 in FIG. 16 is not acceptable, because there are "missing" targets along the left side, while the region within the dashed lines 71 in FIG. 17 is acceptable. The values of $(SNR)_L$ are then determined at those pixel locations in the target image corresponding to the centers of the target lesions.

The invention may be carried out by either locating the positions of the pixels at the centers of the target objects first, and then determining $(SNR)_L$ at those pixels so located, or by calculating the $(SNR)_L$ at every pixel in the target image first, using the computed $(SNR)_L$ data to find the pixels located at the centers of the target objects, and then determining the $(SNR)_L$ for the centers of the target objects.

A preferred procedure for determining the pixel locations in the target image corresponding to the centers of the target spheres involves first computing the mean $(SNR)_L$ over an adequate number of placements of a test array of pixel locations, corresponding to the known relative locations of the centers of the array of spherical phantom targets, so that the maximum mean $(SNR)_L$ corresponds to a superposition of the $(SNR)_L$ array on the sphere array of pixel locations corresponding to the target positions. The phantom 50 and target spheres 56 are shown for illustration in FIG. 18 using continuous lines. The boundary 74 of an exemplary image is shown superimposed in dashed lines. A set of points within the boundary 74 marked by the "■" marks in FIG. 18 defines one test array of pixel locations over which one mean of $(SNR)_L$'s is then computed. Although this (first) test array of pixel locations displays the same relative positions as the sphere array of target spheres in the phantom, the pixel locations in the test array do not necessarily correspond to the target positions in the image. That is also true of the test array of exemplary pixel locations marked by "x" marks at which a mean $(SNR)_L$ is computed in the procedure. Consider the rectangular area 76 of dimensions Dxd in FIG. 18. D is the lateral spacing between targets in one row and d is the vertical spacing between rows. The important requirements for the area 76 is that its area be that allotted to each sphere in the sphere array or test array and that its shape be such that, no matter how the area 76 is positioned or oriented on the test array, at least 1 (and preferably only 1 to minimize computation time) sphere center or array element lies in the area 76. If there are 1 sphere centers (or array elements) per unit area, the area of area 76 is 1/q. Referring again to FIG. 18, the upper left corner pixels of the ■ and x test arrays lie in the area 76. The mean $(SNR)_L$ over all test arrays having their upper left pixels in the area 76 are computed. The translationally optimal test array, corresponding to the best superposition of test array and sphere array, can be found as follows. For positive contrast lesions, that test array having a mean $(SNR)_L$ which is the maximum (most positive) is taken to correspond to the translationally optimal test array, and for negative contrast lesions, that test array having a mean $(SNR)_L$ which is the minimum (most negative) is taken to correspond to the translationally optimal test array. (Note that it may result that there is more than one mean corresponding to a maximum for positive contrast or minimum for negative contrast; these should correspond to test arrays which are nearly superimposed on one another, and any one can be taken as the translationally optimal array.)

It is possible that the translationally optimal array found above will be rotated slightly with respect to the sphere array. A generally (translationally and rotationally) optimal array can be found as follows. Repeat the above procedure for finding the translationally optimal array for test arrays which are all rotated by the same small angle (e.g., +1°) yielding a new translationally optimal array; repeat for some set of rotations (e.g., −1°, ±2°). Select that translationally optimal array which is maximum (for positive contrast lesions) or minimum (for negative contrast lesions). The resulting array position and orientation is the generally optimized array, and is taken to correspond to the best superposition of the test array and the sphere array.

Let $(i_g, j_g)$ be the set of pixel coordinates corresponding to the generally optimal array of pixel locations determined as described above. All these pixel locations are restricted to lie within the diagnostic component of the image. In a rectangular diagnostic component $i_g$ will be the number of pixels axially away from the boundary next to the transducer and $j_g$ will be the number of pixels from the left boundary of the diagnostic component. Let $(SNR)_L (i_g, j_g)$ be the $(SNR)_L$ at $(i_g, j_g)$ For a rectangular diagnostic component, the mean lesion signal-to-noise ratio at depth $i_g$xp, where p is the number of pixels per mm, is $(SNR)_{ML} (i_g, j_g)$ For sector arrays, $(SNR)_{ML}$ at some depth is more complicated in that the mean is done over $(i_g, j_g)$ positions in a strip of image limited by two arcs, each arc corresponding to a given depth. Thus, for sector images, there is a depth range over which $(SNR)_{ML}$ at a given depth is taken to be a measure of imaging performance at that depth.

Alternatively, the positions of the centers of the spherical targets in the array can be determined before calculation of the lesion signal-to-noise ratios $(SNR)_L$. A preferred implementation of the invention in this manner is described below.

As with the initial step in isolating the diagnostic component, the four backgrounds are averaged and subtracted from the target. However, instead of using the absolute value of the subtraction, any pixels below zero are set to zero (for negative contrast spheres, the look-up table (LUT) must be set such that a pixel value of 255 corresponds to the black video level. For positive contrast spheres, the LUT must display a pixel value of 255 at the maximum "white" level.) This reduces the appearance of noise on the subtracted image and, consequently, enhances the appearance of the spheres. The resulting image will be referred to as the "Second Subtracted Work Image."

The Second Subtracted Work Image is smoothed (i.e., an unweighted average) using a circular kernel, as shown in FIG. 19, equal to the target sphere size (with consideration for the spatial calibration of the image). If desired, a square kernel about ¾ of the sphere diameter may be alternatively used. This smoothing creates an image where each pixel represents an average of its surrounding pixels over an area equal to the sphere size, as illustrated in FIG. 20. This also creates a border, or frame, around the image of (kernel size/2)−1. However, since the analysis requires a larger region around the spheres (on the background images), a wider boundary is imposed for subsequent steps [the wider boundary is (2.5 * sphere size/2)−1]. The boundary is referred to as the "frame," and the region within the frame is referred to as the "usable area."

Because the image has been averaged, the pixels can be interrogated individually while retaining information on the entire sphere area. A basic process for locating the position of the target spheres in a perfect matrix is as follows:

1. A virtual grid is created using the known target sphere dimensions and spacings (spatially calibrated for the specific images).
2. The grid is scanned over the entire image (in this case, the image is the Second Subtracted Work Image). At each location, pixels below each grid point are summed. The final sum is divided by the total number of grid points to produce a grid average. Thus, a grid average is produced for each increment of the grid position as it is scanned over the image.
3. After the entire image has been scanned, the maximum grid average represents the virtual grid that contains the highest pixel values, and therefore it is most likely to correspond to the location of the spheres. (Note that positive contrast spheres must be treated differently than negative contrast spheres, and attention must be made to the assignment of the look-up-table to determine if black is assigned to a pixel value of 0 or 255).

Scanning the virtual grid over the image in the foregoing manner generally would be inefficient in terms of computer processing time. The process may be expedited by taking advantage of the fact that, as a first approximation, the spheres should lie in columns and rows. With this approximation, the first sphere is assumed to be at the upper left-hand corner of the image within the usable area. A column of data with this point as the zero'th index is placed into an array. The column of data is re-indexed (into another array) in such a fashion as to match the index with a specific grid location as illustrated in FIG. 21. For example, the first pixel in the first column is added to the zero'th index in a summing array. The next pixel downward would be added to index "one" of the summing array. The process would be repeated until the position of the next sphere in the y-direction is reached, at which point the next pixel (corresponding to the position of the center of the second sphere in the first column) would be added to the zero'th index of a summing array. The next pixel after this one would be added to index "one" of the summing array and the process is repeated until all pixels in the entire column have been added to the proper element of the summing array (an element of an array is defined by its index value). The total number of indices for the summing array is the number of pixels that separate two spheres that lie in the same column (this can be calculated by knowing the spatial calibration of the image and the actual separation of the spheres within the phantom). The resulting summing array contains the sums of pixels corresponding to one column of many virtual grids—each index refers to a unique grid origin in the first column. To find the remaining elements of each virtual grid with an origin in the first column, additional columns (vectors) of data are analyzed in a similar manner. The columns are chosen based on the separation of the spheres in the x-direction (with consideration to the spatial calibration of the image). Therefore, the next column (vector) that would be analyzed would be located a distance equal to the sphere separation (in the x-direction) from the previous column. However, since the spheres are staggered in the phantom, the first pixel in the second column does not belong to the same virtual grid as the first pixel in the first column. Therefore, the first pixel must be added to the summing array at an index that corresponds to "its" virtual grid of the first column. The index of the first pixel in the second column would equal half of the maximum number of indices. For example (see FIG. 21), assume the eight pixels separate two spheres that lie in the same column, and five pixels separate two spheres that lie in adjacent columns of spheres. Also assume that the virtual grid of interest has its origin in the upper left-hand corner of the image [coordinate (0,0)]. The first grid point (in the first column) is at pixel (0,0). The second grid point (in the first column) one would be at pixel (0,8). The next grid point in the same column would be at pixel (0,16), etc. The first grid point in the second column would be at pixel (5,4). The next grid point in the second column would be at pixel (5,12), the next would be at (5,20), etc. The pixel values associated with each of the locations should be added to the same element of the summing array. The third column (vector) would be located at a distance equal to twice the separation of two spheres that lie in adjacent columns of spheres. The order of the indexing into the summing array for the third column would be identical to that of the first column, as would the ordering the fourth column be identical to that of the second column. The number of columns (vectors) to be analyzed is calculated with consideration for the size of the image (in the x-direction) and the sphere spacing (in the x-direction). Completing one cycle of this algorithm thus provides a vector of summed values. Each summed value has a unique index in the vector and each corresponds to a grid that originates from a different y-location (but with identical x locations for the grid origin). Each element of the summed vector is then divided by the number of occurrences of the particular index within the virtual grid to yield the average grid pixel value. The maximum average grid pixel value is determined and retained along with the index at which it occurred. Hence, one cycle yields the most probable grid origin in the y-direction for a specific x-coordinate grid origin. Note that this algorithm can also be used by reversing the role of the x and y-directions, i.e., acquiring rows (vectors) of data and including the data based on x-positions.

The columns of data are then incremented in the x-direction by one pixel and the process is repeated, as illustrated in FIG. 22. After the entire image has been interrogated, the grid with the maximum average grid value corresponds to the most probable location (origin) of the actual grid of spheres. The y-coordinate of the grid can be determined from the index of the summing array, and the x-coordinate is given by the increment counter for the x-direction. The resulting point corresponds to the uppermost left-hand sphere within the image, from which the locations of all remaining spheres can be determined.

There is a complicating factor with the sector formats when using the above technique to locate the position of the spheres, namely, that columns of equal height of image data cannot be acquired because the height of the diagnostic component is not constant. If this consideration were ignored, the calculated grid average would be biased due to the influence of pixels from the image backboard that tend to be very low (or zero) on the Second Subtracted Work Image. This problem can be avoided by simply masking out the backboard region with black (255) pixels. The pixels can then be tested to assure that they lie within the diagnostic component prior to indicing. Note that a pixel value 255 on the subtracted image would be highly unusual. Also, with the sector formatted images, the calculated sphere locations must also be verified to assure that they lie within the usable area of the defined sector region. Information for each sphere is retained in a record. The record includes the x-coordinate, y-coordinate, row number, and the signal-to-noise ratio.

After the predicted pixel locations of the target spheres are determined, the system may then search around each position for a local maximum. That is, a specified area around each predicted sphere is interrogated to locate a maximum independently of the positions of the remaining spheres. This is done on the Second Subtracted Work Image and can compensate for any rounding or truncating errors that may occur in determining the positions of the spheres. However, when the sphere locations are allowed to move independently, the resulting sphere array may not necessarily be a perfect matrix. If desired, the determined positions of the entire array may be adjusted by a specified amount.

Figure 29:
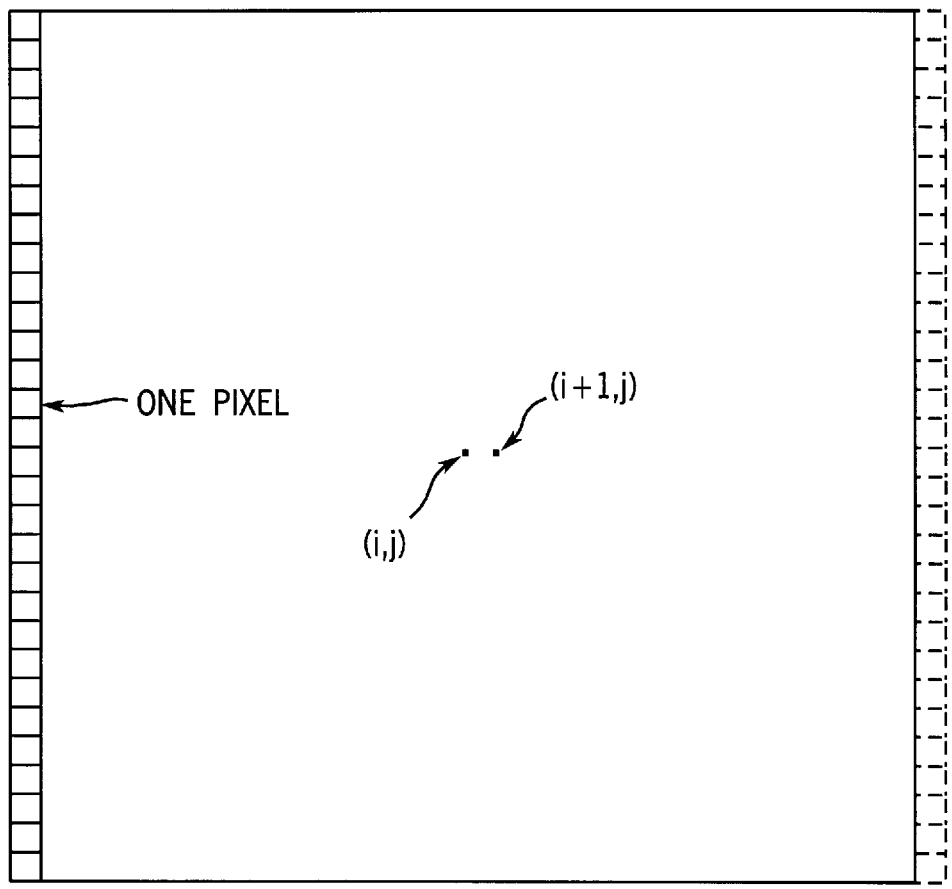
FIGS. 29–32 are diagrams illustrating further procedures for locating the arrays of target spheres in an image.
Figure 30:
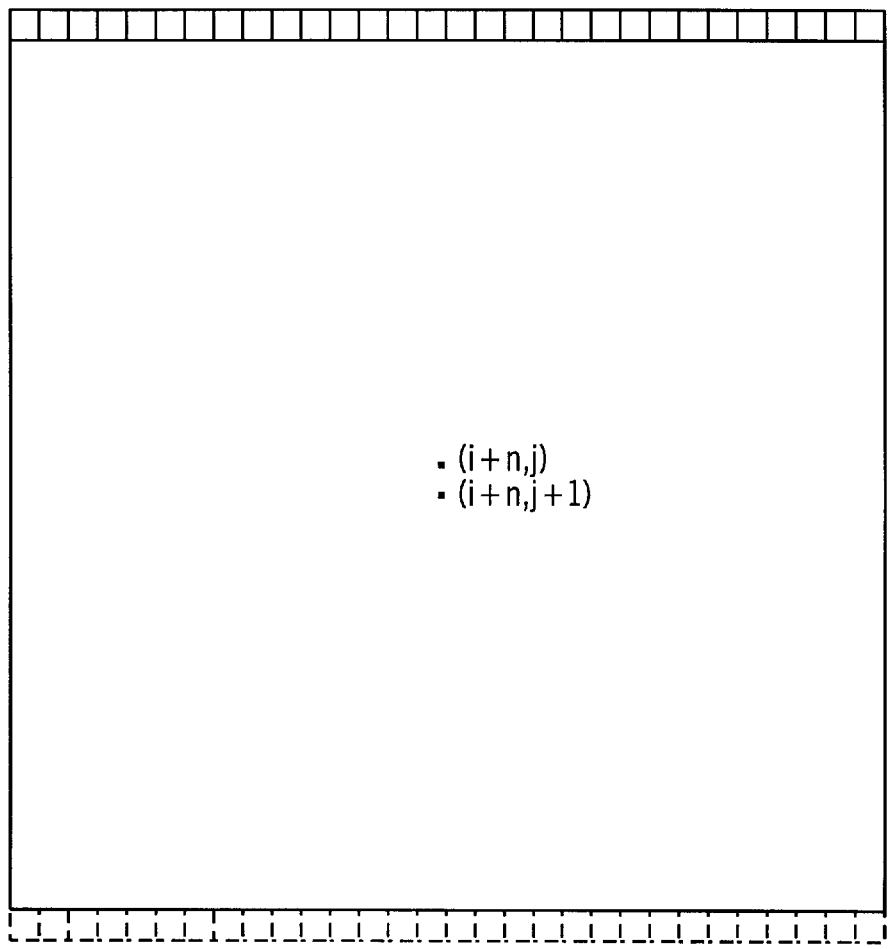

In one procedure for locating the target spheres in the image by superimposing the pixel array on the sphere array, a first step is to compute $(SNR)_L$ at all possible pixel locations in the diagnostic component. If each $(SNR)_L$ is computed without using results from computations used for determining other $(SNR)_L$ values, the process is very inefficient. Thus, ways to improve computation speed without significant loss of accuracy are employed. For example, the area A, for computing $S_B$ over all pixels may be taken to be square with side 2.5 times the sphere diameter. A, has the same size and shape for each pixel at which $(SNR)_L$ is to be computed. Consider two adjacent pixels with coordinates (i,j) and (i+1,j) as shown in FIG. 29 where the 1st coordinate in each pair specifies the lateral location and the second specifies depth location. If $S_B$ has been found for pixel (i,j), the $S_B$ for pixel (i+1,j) just equals that for the (i,j) pixel with the pixel values for the left column of pixels subtracted and pixel values for the adjacent column to the right added. Once values for $S_B$ at (i+n,j) for all possible values n=0, 1, 2, 3, . . . have been found and stored in memory, the same process can be applied for the j coordinate. Thus, given that $S_B$ corresponding to (i+n,j) has been determined, then $S_B$ at (i+n, j+1) can be found by subtracting pixel values for row 3 (see FIG. 30) and adding pixel values for row 4.

If the area A, does not include a central smaller square or circular area, the same concept can be applied.

Figure 31:
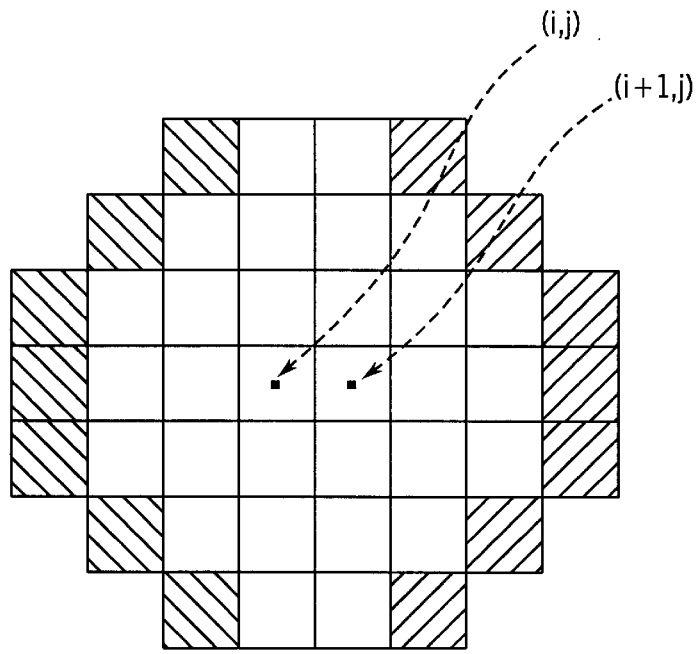

With regard to the computation of $S_L$ over the areas A, if the areas A are squares, the same procedure as that described above for computing the $S_B$'s can be used. If the area A has some shape other than a square, such as a circle or octagon, the pixel values from one edge need to be subtracted and pixel values adjacent to the other edge added to complete the new $S_L$. This is illustrated in FIG. 31 where pixel values for black pixels are subtracted and pixel values for cross-hatched pixels are added to get $S_L$ at (i+1,j) from that at (i,j). Since all that is needed in the numerator of $(SNR)_L$ is $S_L - S_B$, all values of $S_B$ in memory may have their signs changed (in memory) before computing $S_L$'s Then, as each $S_L$ is computed, it can be added to the $-S_B$ for the corresponding pixel location; this will minimize memory usage.

In the case of computation of the "noise," σ, either the standard deviation (SD) or standard error (SE) type, negligible change in σ is expected over any 1 mm translation. Therefore, computation of σ over a square array of pixels with 1 mm spacing is sufficient. The value of σ to use in the computation of $(SNR)_L$ for an arbitrary pixel location (i,j) is then that σ at the position in the 1 mm square array which is closest to (i,j).

Figure 32:
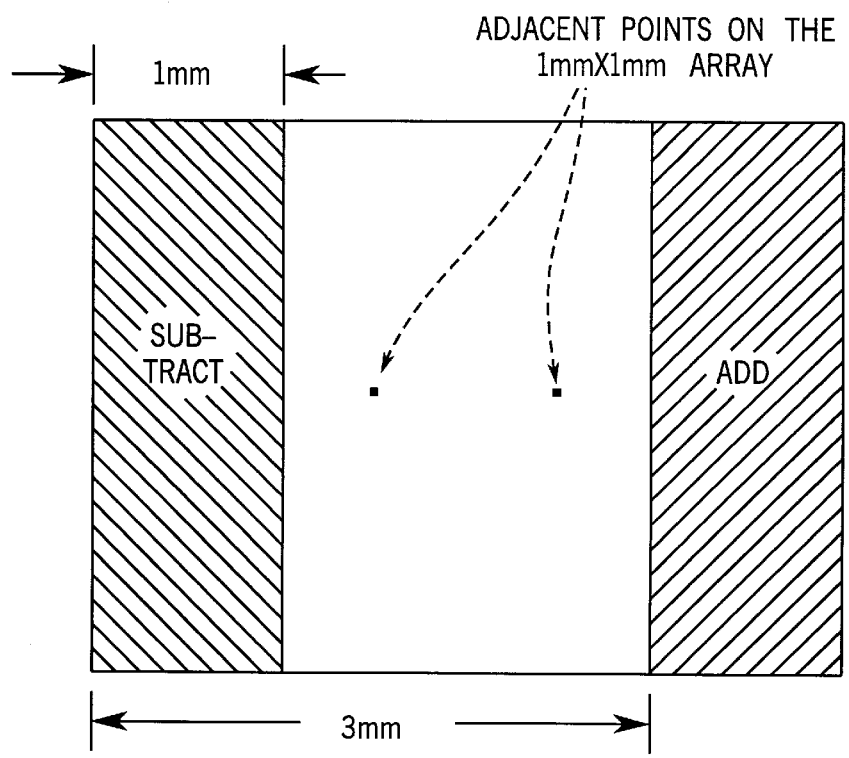

In computation of σ, a set of samples $s_m$ given by mean pixel values over sub-areas A distributed over, e.g., a 10 mm×10 mm area, is employed in the SD or SE computation. The 10 mm×10 mm is centered at one of the pixel locations in the square array 1 mm on a side. The computations can be speeded up by first computing $s_m$ values at each of the pixel locations in the 1 mm×1 mm array of pixels and storing them in memory. Speeding up of these computations can be done in a way analogous to that for speeding up the $S_B$ and $S_L$ computations described above, except that the spacing between areas A is now 1 mm instead of 1 pixel length; thus, for two locations in the 1 mm×1 mm array differing by a lateral shift of 1 mm, the mean pixel value in a 1 mm edge on one side of A is subtracted and the mean pixel value of the corresponding edge on the other side of A is added. An example is shown in FIG. 32 for subarea A consisting of a 3 mm×3 mm square. All means $S_m$ of the 1 mm×1 mm square area are stored in memory. Computation of SE or SD for some pixel location in the 1 mm×1 mm array can then be done using those $S_m$'s and—in the case of SE computation—corresponding pixel locations in the 1 mm×1 mm array, which lie in the 10 mm×10 mm area centered at the location of concern in the 1 mm×1 mm array. Note that the spacing of the square array of pixel locations at which SE or SD is computed can have any spacing b desired, providing it is at least 1 pixel length. Also, the square array over which the $S_m$'s are computed can have any spacing $c \geq 1$ pixel length, and it is not necessary that b=c.

Figure 23:
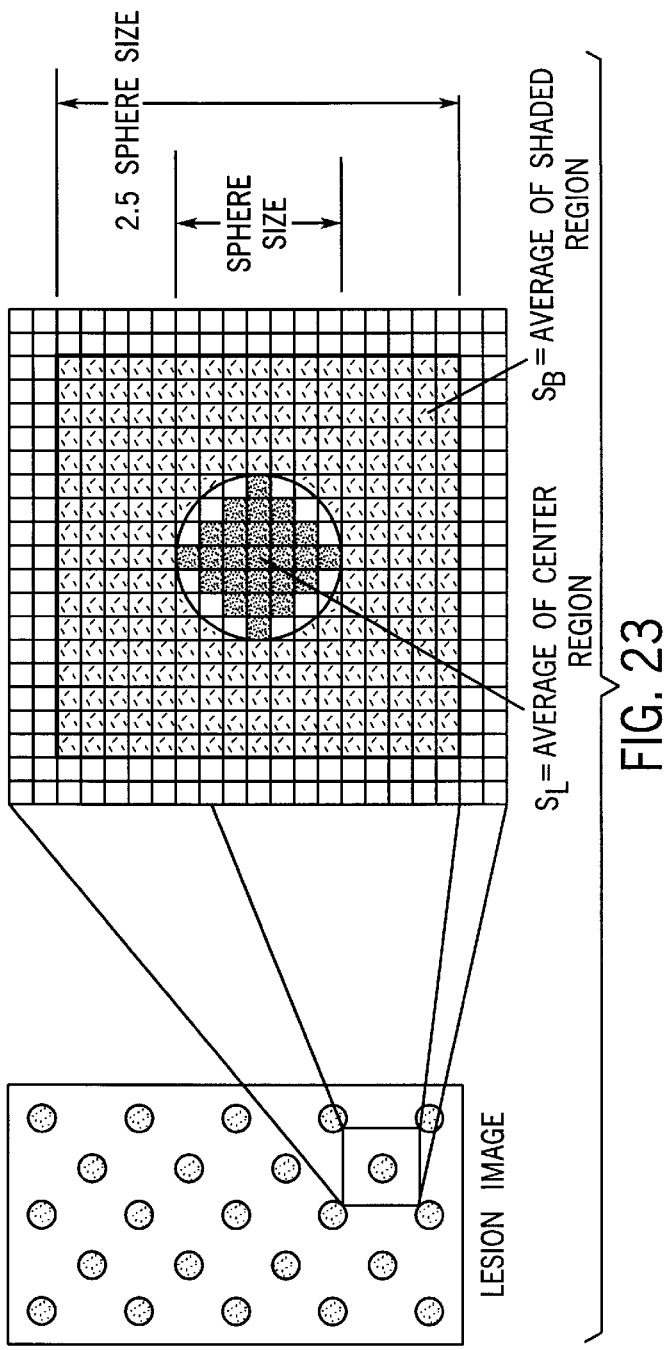
FIG. 23 is an illustrative view showing calculation of the signal on the target image.

The lesion signal-to-noise ratio $(SNR)_L$ at each pixel in the target image is preferably determined either before or after the positions of the spherical targets are located, using the standard error (SE) method discussed above. On the target image as illustrated in FIG. 23, the average pixel value, $S_L$, is obtained for a circular or square area A centered at a target sphere site in the image and having an area equal to (or approximating) a circle with a diameter equal to that of a target sphere. The background level for the sphere is also measured as the average of all pixels with an area of size 2.5 times the area of a circle with a diameter equal to that of a target sphere. For example, the outer boundary of the area A over which the mean background level is computed might be a square with side 2.5 times the target sphere diameter, and the inner boundary would be that of A and would be concentric with the outer boundary. The mean pixel value over the area between outer and inner boundaries is called $S_B$. The signal level is taken to be $S_L$ minus $S_B$.

Figure 24:
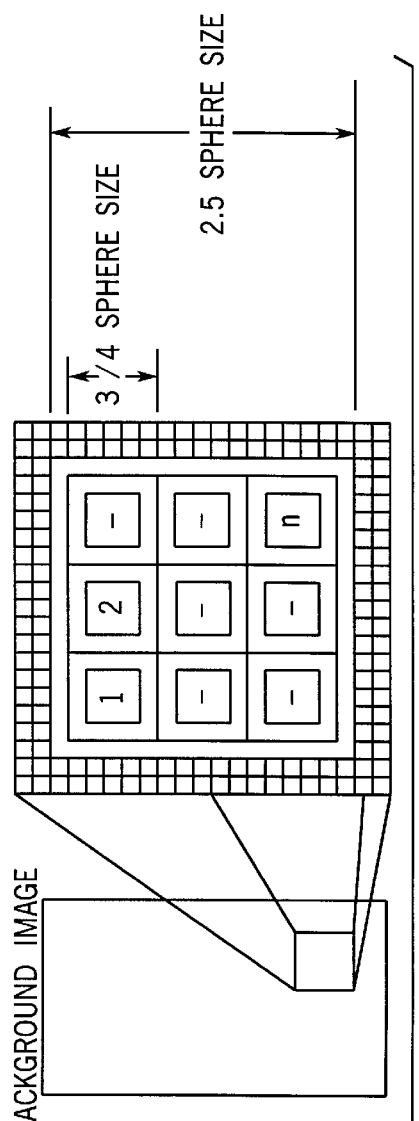
FIG. 24 is an illustrative view showing the manner in which the average pixel value of sub-areas is calculated, from which the standard error of the mean is determined.

The noise value is determined from the four background images as illustrated in FIG. 24. Centered over each sphere position on a background image is a square area $A_B$ with side equal to 2.5 times the target sphere diameter. This area is divided into sub-areas, each with different positions, but all with the square area A (see above). The centers of these sub-areas might form a square lattice, with 1 mm spacing so that as many pixels of $A_B$ as possible are contained in one or more sub-areas. For illustrative purposes the sub-areas in FIG. 24 are shown to be contiguous, although typically the sub-areas overlap. The average pixel value within each sub-area is then calculated. The noise value $\sigma_B$ associated with all sub-areas can be determined as described in U.S. Pat. No. 5,574,212, or other estimates, as described, but preferably is approximated by the SE method for the ensemble of sub-areas as follows:

$$\sigma_B = \left[ \frac{\sum_{n=1}^{N} (Z_n - Z_{nc})^2}{N} \right]^{1/2} \quad (6)$$

where $Z_n$ is the mean over the Nth sub-area over a larger area in the background image centered at the pixel location of concern, $Z_{nc} = a + bX_n + cY_n$, and the coefficients a, b and c can be found from the relations $$\Sigma Z_n = aN + b\Sigma X_n + c\Sigma Y_n,$$

$$\Sigma Z_n X_n = a\Sigma X_n + b\Sigma X^2_n + c\Sigma X_n Y_n,$$

and $$\Sigma Z_n Y_n = a\Sigma Y_n + b\Sigma X_n Y_n + c\Sigma X_n Y_n.$$

The X and Y variables refer to the x- and y-coordinates within the region being interrogated.

The SE method corrects for local mean pixel value gradients that may be present in the image, especially near the periphery of the diagnostic component. (Local mean pixel values might be computed over a 2 mm×2 mm square area, for example) The noise is calculated independently for all spheres on each background image. The average noise value for all backgrounds is then averaged (root mean square) for each sphere location yielding $J_{MB}$. The $(SNR)_L$ is then given by, $(SNR)_L = (S_L - S_B)/\sigma_{MB}$. Given a rectangular diagnostic component, for each row of target spheres at the same depth, a mean value $(SNR)_{ML}$ at that depth is calculated as the average of the $(SNR)_L$ values for all target sphere positions in the row. The corresponding $(SNR)_{ML}$ for sector type would be the mean of $(SNR)_L$'s in a curved area segment between one arc at one depth and another arc at a depth greater by, e.g., 1 cm.

The average $(SNR)_{ML}$ may be displayed on the display screen 41 and/or on a printed copy as a plot of $(SNR)_{ML}$ as a function of the depth.

Figure 25:
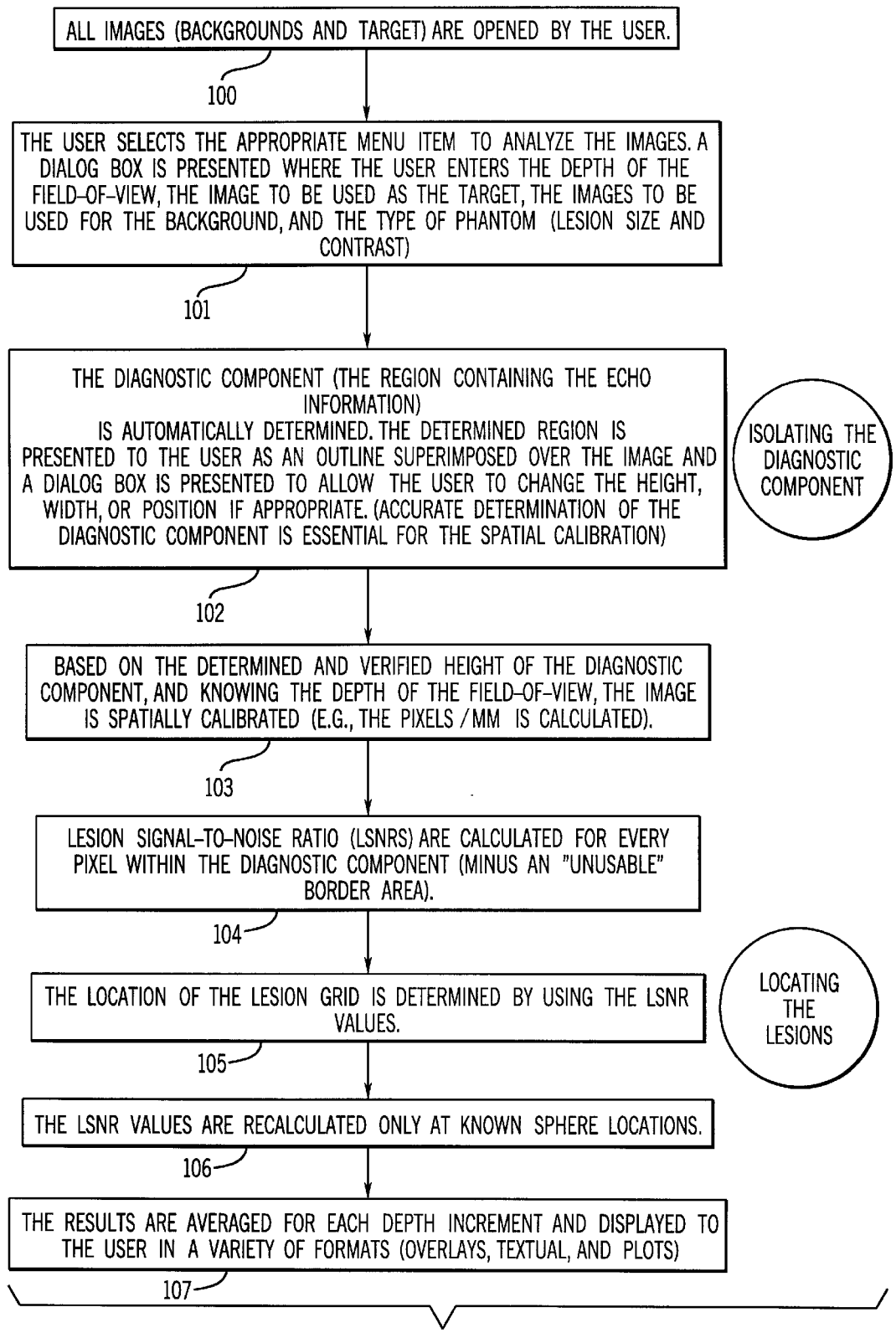
FIGS. 25–28 are flow charts illustrating detection of target spheres and $(SNR)_L$ calculation in accordance with the invention.

Exemplary flow charts illustrating the programming steps carried out by the computer of the system in accordance with the invention are shown in FIGS. 25–28. FIG. 25 illustrates the primary preferred processing steps of the program. As illustrated therein, initially, all images, background and target, are opened by the user at 100, and then the user selects the appropriate menu item to analyze the images at 101. Computer processing is then carried at 102 to isolate the diagnostic component. Based on the determined and verified height of the diagnostic component, and knowing the depth of field-of-view, the image is spatially calibrated at 103, and the lesion signal-to-noise ratios $(SNR)_L$ are calculated at 104 for every pixel within the diagnostic component (with an unusable border area removed). The location of the lesion grid is then determined using the $(SNR)_L$ values at 105. The $(SNR)_L$ values are recalculated only at known sphere locations at 106, and the results are displayed to the user in a variety of user selected formats (for example, overlays, text and plots).

Figure 26:
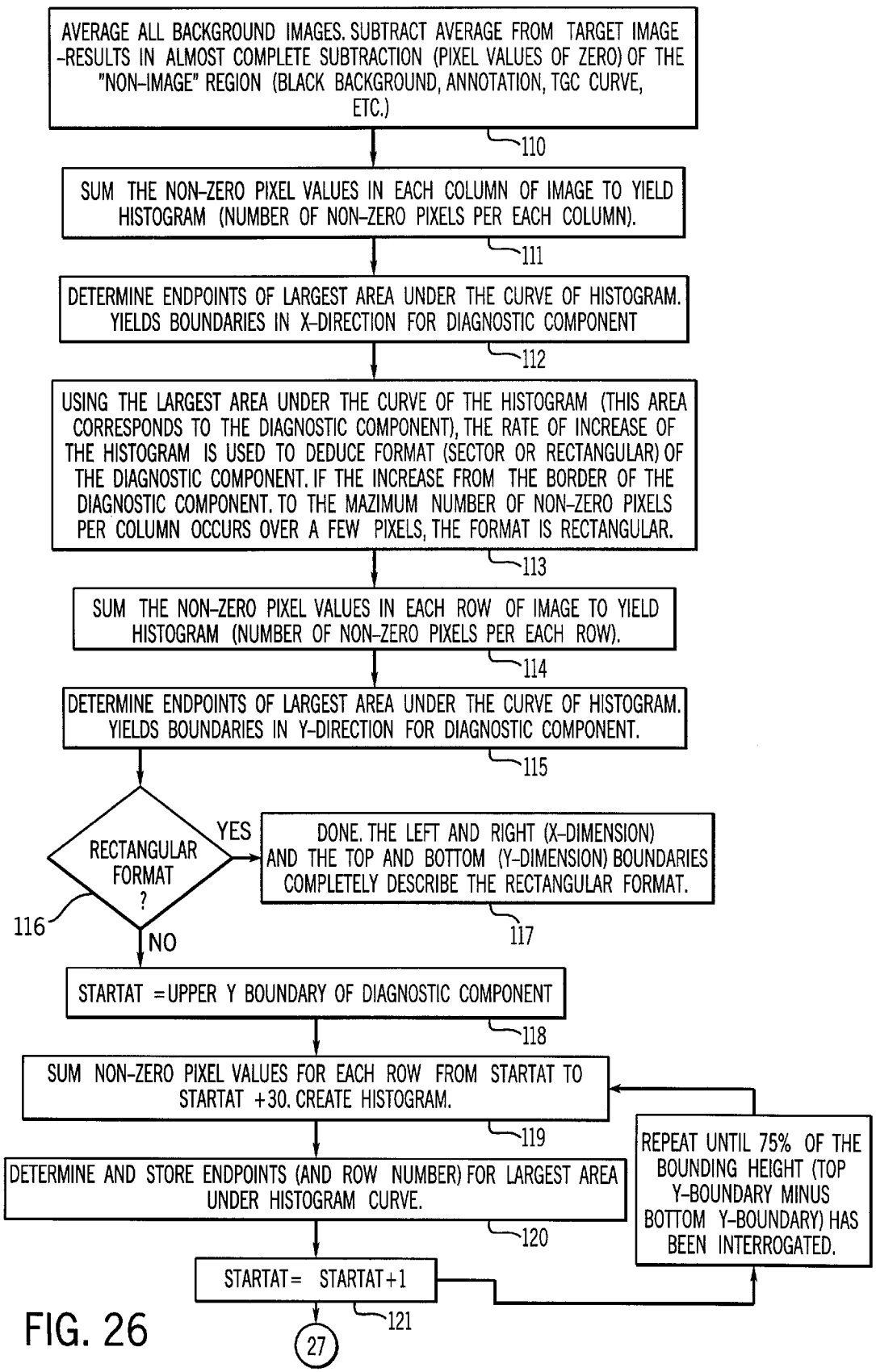
Figure 27:
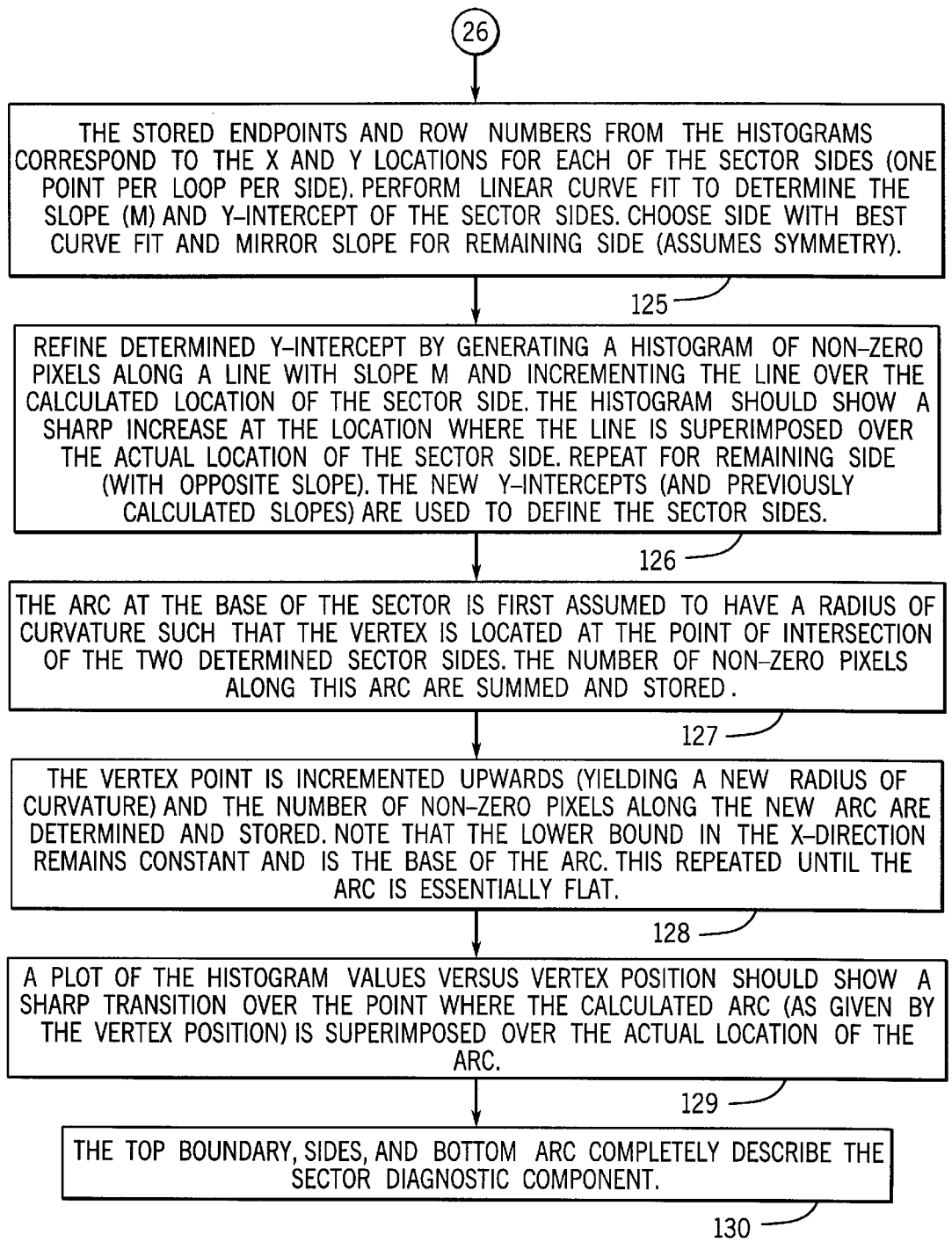

FIGS. 26 and 27 illustrate the main processing steps in sphere detection and lesion signal-to-noise ratio $(SNR)_L$ calculation. The first step, as indicated at 110, is to average all background images, and subtract the average from the target image to result in almost complete subtraction of the non-image region. Next, the non-zero pixel values are summed in each column of image at 111 to yield a histogram indicating the number of non-zero pixels per each column, and the end points of the largest area under the curve of the histogram are determined at 112 to provide the boundaries in the x-direction for the diagnostic component. Thereafter, using the largest area under the curve of the histogram, the rate of increase of the histogram is used to determine the format (sector or rectangular) of the diagnostic component at 113. The format is determined to be rectangular if the increase from the border of the diagnostic components to the maximum number of non-zero pixels per column occurs over a few pixels.

The non-zero pixel values in each row of image are summed at 114 to yield a histogram indicating the number of non-zero pixels per each row. The end points of the largest area under the curve of the histogram are then determined at 115 to find the boundaries in the y-direction for the diagnostic component. If the format has been determined to be rectangular, the program is done as indicated at 117, and the left and right and the top and bottom boundaries completely describe the rectangular format. If not, the program continues at 118 to set a variable StartAt=upper Y boundary of diagnostic component, the non-zero pixel values are summed for each row at 119 from StartAt to StartAt+30 to create a histogram, and the end points are determined and stored for the largest area under the histogram curve at 120. StartAt is then set equal to StartAt+1 at 121 and the program recycles back to 119 and the process is repeated until 75 percent of the boundary height (top Y boundary–bottom Y boundary) has been interrogated. When this condition is reached, the program proceeds to the steps indicated in FIG. 27.

The next step, indicated at 125, is to perform a linear curve fit to determine the slope (m) and y-intercept of the sector sides, choosing the side with the best curve fit, and using the mirror of the slope for the remaining side, assuming symmetry. The stored end points and row numbers from the histograms correspond to the x and y locations for each of the sector sides. Next, the determined y-intercept is refined at 126 by generating a histogram of non-zero pixels along the line with slope=m and incrementing the line over the calculated location of the sector side. The histogram should show a sharp increase at the location where the line is superimposed over the actual location of the sector side. The process is repeated for the remaining side (with opposite slope) and the new y-intercepts (and the previously calculated slopes) are used to define the sector sides. Next, at 127, assuming that the arc at the base of the sector has a radius of curvature such that the vertex is located at the point of intersection with the two determined sector sides, the number of non-zero pixels along this arc are summed and stored.

The vertex point is then incremented upwardly at 128, yielding a new radius of curvature, and the number of non-zero pixels along this new arc are determined and stored. The lower bound and the x-direction remains constant and is the base of the arc. The process is repeated until the arc is essentially flat. The histogram values versus vertex position are plotted at 129 to verify a sharp transition over the point where the calculated arc (as given by the vertex position) is superimposed over the actual location of the arc. Upon this verification, the top boundaries, sides, and bottom are provided at 130 to define the entire sector diagnostic component.

Figure 28:
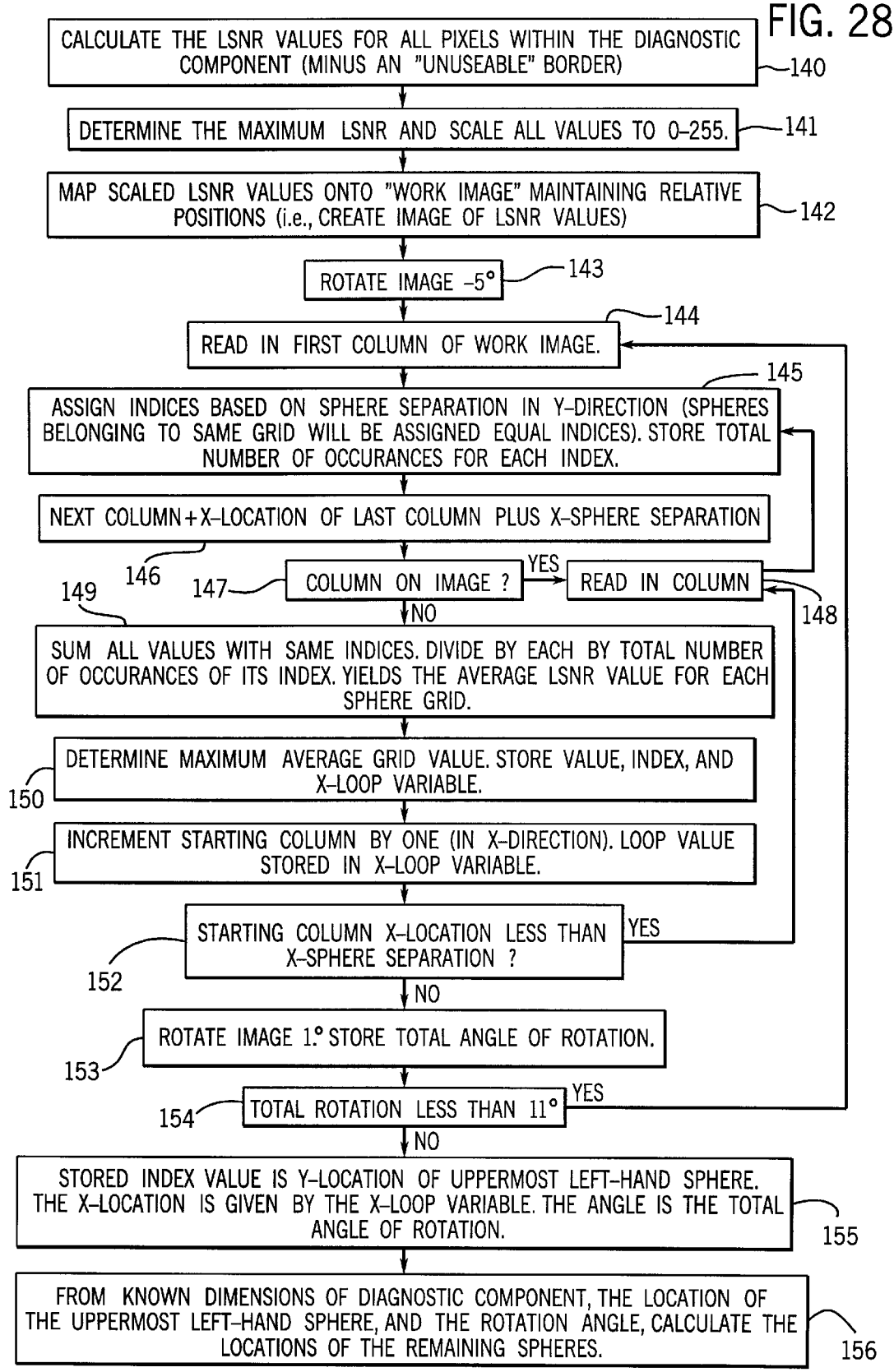

FIG. 28 shows the steps in the programming that carries out the location of the lesions (step 105 of FIG. 25). As a first step, the lesion signal-to-noise ratio $(SNR)_L$ values for all pixels within the diagnostic component are calculated at 140, and the maximum $(SNR)_L$ is determined at 141 and all values are scaled to a convenient scale, for example, from 0 to 255. The scaled $(SNR)_L$ values are then mapped at 142 onto a "work image" while maintaining the relative positions, effectively creating an image of $(SNR)_L$ values. This image is then rotated, e.g., minus 5°, at 143, and the first column of the work image is read in at 144. Indices are assigned at 145 based on sphere separation in the y-direction with spheres belonging to the same grid assigned to equal indices. The total number of occurrences for each index are stored. Next, at 146, a variable "Next column" is set equal to the x-location of the last column plus the x-sphere separation, and a determination is made at 147 whether the column is on image. If yes, the column is read in at 148 and the program cycles back to step 145. If no, the program proceeds to 149 to sum all values with the same indices, and divide each by the total number of occurrences of its index to yield the average $(SNR)_L$ value for each sphere grid. Then the maximum average grid value is determined at 150 and the value so determined, the index, and the x-loop variable are stored, and the program proceeds to 151 to increment the starting column by one in the x-direction and to store the loop value in the x-loop variable. Next, the program determines at 152 whether the starting column x-location is less than the x-sphere separation; if yes, the program proceeds to read in the column at 148 and then proceed back to step 145. If no, the stored index value is determined at 155 as the y-location of the uppermost left-hand sphere and the x-location as given by the x-loop variable. The angle is the total angle of rotation. The program then proceeds at 156 to calculate, from the known dimensions of the diagnostic component, the location of the upper most left-hand sphere and the rotation angle, the locations of the remaining spheres.

Using phantoms with a variety of lesion sizes and contrasts and a two-alternative-forced-choice (TAFC) analysis for both human observers and the automated system of the invention, a detectability threshold for negative contrast lesions and a threshold for positive contrast lesions may be established. A preferred procedure for doing so is discussed below.

Phantoms images are acquired under various scan configurations (i.e., different frequencies, field-of-view, and focal zone depths). For each scanner configuration and array of target spheres of given size and contrast, the scan slice is positioned perpendicularly to the plane containing the sphere centers so that a single column of target spheres is centered in the scan slice; the n'th image is digitized and stored.

For the same scanner configuration and sphere size and contrast, all possible different columns are centered in the scan slice and the images digitized and stored. The total number of such images—including all involved scanner configurations and target sphere sizes and contrasts—might be 100.

For each such digitized image there will be depth ranges at which spheres are barely detectable. For depths at which spheres are barely detectable and at adjacent depths where spheres are apparently undetectable, pairs of 1 cm×1 cm square image areas are extracted, one in which the target lesion is known to be present and the other (at the same depth) where the target lesion is known not to be present (background). The position of the lesion within the small region is randomly assigned to one of nine possible locations (the possible locations are similar to the positions of the numbers 1–9 on the numeric keypad of telephone). Only lesions at or near the level of detectability will be considered. That is, obviously detectable lesions will not be presented. The pairs of images are analyzed by at least three observers, one of which is preferably a radiologist. The observers indicate which of the images contains a lesion. The results provide the number of correct detections for each lesion size and contrast value over specific depth increments. The human observer analysis will yield proximal and distal limits of the resolution zone for each scanner configuration and sphere size and contrast.

Each scanner configuration and sphere size and contrast will also be analyzed by automation in accordance with the invention, yielding $(SNR)_{ML}$ values for each lesion size, contrast value, and depth increment. Since the resolution zone of the automated method is determined from a threshold $(SNR)_{ML}$ value, the optimal threshold $(SNR)_{ML}$ can be determined by choosing the threshold $(SNR)_{ML}$ value that yields a resolution zone which most closely matches that obtained from human observers. In other words, the threshold $(SNR)_{ML}$ value will be selected such that it mimics the response of the human observers. The analysis must be repeated for each scan configuration and each lesion type. To best quantify the comparison, the proximal and distal detectability limit values of both the human observers and automation will be examined separately, the only fixed variable being the lesion diameter (size). The difference in the limits between human observers and automation can then be squared and subtracted—the minimum resulting value will indicate the optimal threshold $(SNR)_M$. Mathematically, this may be written as $$\sum_{i=1}^{N} [(P_{Obs} - P_{auto})_i^2 - (D_{Obs} - D_{auto})_i^2]$$

where P is the proximal detectability limit, D is the distal detectability limit, and the subscripts "Obs" and "auto" refer to the human observers and automation, respectively. The summation, N, is over all scanner configurations and contrasts. Optimization of the threshold $(SNR)_{ML}$ needs to be repeated for each lesion diameter. Therefore, each lesion size would be assigned a threshold $(SNR)_{ML}$ value that could be universally used to determine the resolution zone for any scanner configuration.

The TAFC study provides a measure of calibration for the automated method and an absolute calibration for the (SNR)$_{ML}$ threshold value in terms of the phantom images. A clinical study may also be done, if desired, to provide a measure of the agreement of the derived threshold values with patient scans.

It is understood that the invention is not confined to the particular embodiments set forth herein as illustrative, but embraces all such modified forms thereof as come within the scope of the following claims.

What is claimed is:

1. An automated system for testing the resolution capabilities of medical imagers, comprising:
    (a) means for storing digitized target image data of an image corresponding to a slice whose midplane is superimposed on a plane of a phantom which contains the centers of an array of target spheres having a known spacing in the array and known diameter, and for storing digitized background image data of an image corresponding to a slice of the phantom which contains only background material;
    (b) means for retrieving the stored target image and background image data for analysis;
    (c) means for locating the positions of a plurality of the target spheres in the target image data based on the known spacing between and the known diameter of the target spheres in the phantom;
    (d) means for determining a lesion signal-to-noise ratio at the located positions of the plurality of target spheres in the target image using an average target value calculated from target image data over sample areas corresponding to the known diameter of the target spheres at the located positions of the target spheres in the target image, an average background value calculated from image data over averaging areas centered at the located positions of the target spheres and including mostly background image data in the target image not within the expected regions of the target spheres in the target image data, and an average background plane noise value calculated from image data over averaging areas centered at the located positions of the target spheres in the background image, the signal-to-noise ratio being determined as the average target value minus the average background value all divided by the average background plane noise value.

2. The automated system of claim 1 further including means for determining the average signal-to-noise ratio $(SNR)_{ML}$ of the target spheres in a plurality of rows in correlation with the depth in the phantom of each such row, and means for displaying $(SNR)_{ML}$ as a function of depth of the target spheres in the phantom.

3. The automated system of claim 1 for use with an ultrasound phantom in which the target spheres are formed in the phantom in an array of regularly spaced rows and columns of target spheres, and including a means for averaging the background images and subtracting the averaged background image from the target image with truncation of negative pixels values to provide a subtracted image, and including means for smoothing the subtracted image to provide a smoothed image, wherein the means for locating the positions of a plurality of the target spheres in the subtracted image does so by creating a virtual grid using the known target sphere dimensions and spacings, scanning the grid pixel by pixel over the smoothed subtracted image and summing the smoothed subtracted image values of the pixels below each grid point, dividing the final sum by the total number of grid points to produce a grid average for each increment of the grid position as it is scanned over the image, and after the entire image has been scanned, determining the maximum grid average representing the virtual grid that contains the highest summed value and designating that virtual grid as the located positions of the target spheres.

4. The automated system of claim 1 for use with an ultrasound phantom in which the target spheres are formed in the phantom in an array of regularly spaced rows and columns of target spheres, and including a means for averaging the background images and subtracting the averaged background image from the target image with truncation of negative pixels values to provide a subtracted image, and means for smoothing the subtracted image to provide a smoothed subtracted image, wherein the means for locating the positions of a plurality of the target spheres in the subtracted image does so by initially assuming that the first sphere is located in the upper left-hand corner of the smoothed subtracted image within a usable area of the subtracted image, forming a column of data with this point as the 0th index and placing the column of data into an array, reindexing the column of data to match the index with a specific grid location, and evaluating columns of data for each grid, with the assigned indices for each element determined based on the y-location of each pixel, the columns for each specific grid then acquired at intervals in the x-direction with each interval being separated by the known x-spacing of the spheres, completing a cycle to provide a vector of summed values with each summed value having a unique index in the vector corresponding to a grid that originates from a different y-location, dividing each element of the summed vector by the number of occurrences of the particular index within the virtual grid to yield the average grid pixel value, and then determining the maximum grid pixel value and retaining it along with the index at which it occurred to determine the most probable grid location in the y-direction for a specific x-coordinate, then incrementing the columns of data in the x-direction by one pixel and repeating the process until the entire image has been interrogated, and determining the grid with the maximum average grid value as corresponding to the most probable location of the actual grid of spheres with the y-coordinate of the grid determined from the index of the summing array and the x-coordinate given by the increment counter for the x-direction to provide a point corresponding to the upper-most left-hand sphere within the image, and then determining the locations of all remaining spheres based on the known spacing and diameter of the spheres.

5. The automated system of claim 1 wherein the average target pixel value $S_L$ is calculated using a circular region on the target image centered at the located positions of the target spheres with the region having a size corresponding to the dimensions of a sphere, and wherein the background value $S_B$ is determined as the average of all pixels with an area of a size a selected diameter greater than the size of the sphere and centered directly over the sphere with the area over the located positions of the target spheres not included.

6. The automated system of claim 5 wherein the noise value $\sigma_B$ is determined from regions in the background image having dimensions a selected amount larger than the diameter of the target spheres, with each region divided into subareas, each having dimensions which are smaller than the target sphere size, with the noise value associated with the subareas determined as follows:

$$\sigma_B = \left[ \frac{\sum_{n=1}^{N} (Z_n - Z_{nc})^2}{N} \right]^{1/2}$$

where $Z_n$ is the mean pixel value over the nth sub-area over a larger area in the background image centered at the pixel location of concern, $Z_{nc}=a+bX_n+c_{Y_n}$, and the coefficients a, b and c are found from the relations $$\Sigma Z_n = aN + b\Sigma X_n + c\Sigma Y_n,$$

$$\Sigma Z_n X_n = a\Sigma X_n + b\Sigma X^2_n + c\Sigma X_n Y_n,$$

and $$\Sigma Z_n Y_n = a\Sigma Y_n + b\Sigma X_n Y_n + c\Sigma X_n Y_n,$$

and wherein the X and Y variables refer to the x- and y-coordinates of the center of the nth subarea within the region being interrogated.

7. The automated system of claim 1 further including means for analyzing the stored target image data and background image data to determine if the scanned format is rectangular or sector, and if the scanned format is determined to be a sector format, further including means for determining the bounding arc and sides of the sector in the target image and the background image.

8. The automated system of claim 1 wherein data for multiple background images are stored by the means for storing, and wherein the means for retrieving retrieves the data for the multiple background images, and wherein the noise value $\sigma_B$ is the mean value $\sigma_{MB}$ of the $\sigma$ values for the multiple background images.

9. The automated system of claim 1 wherein data for multiple background images are stored by the means for storing, and wherein the means for retrieving retrieves the data for the multiple background images, and further including means for averaging the multiple background images, and subtracting the result from the target image to produce a subtracted work image setting any pixels having values below zero to zero in the averaged image.

10. The automated system of claim 9 further including means for smoothing the subtracted work image using a kernel corresponding to the target sphere size and shape to create a smoothed image wherein each pixel represents an average of its surrounding pixels over an area equal to the target sphere size.

11. The automated system of claim 10 wherein the means for locating the positions of the plurality of target spheres locates the positions of the target spheres using the smoothed target image by averaging the values of pixels that are spaced from one another with a spacing corresponding to the spacing between the expected centers of the target spheres in the rows and columns of target spheres in the array of target spheres to provide averages for all pixels lying in corresponding positions in subarrays of a width corresponding to the spacing in pixels between the centers of target spheres in each row of target spheres and of a height in pixels corresponding to the spacing between the centers of target spheres between rows of target spheres, and wherein the pixels in the corresponding positions of the subarrays having the largest average are identified as the center pixel locations of the target spheres.

12. The automated system of claim 1 further including means for displaying the maximum and minimum signal-to-noise ratio in each row of spheres.

13. The automated system of claim 1 wherein the means for locating the positions of a plurality of target spheres determines a lesion signal-to-noise ratio at each pixel in the target image data, wherein the lesion signal-to-noise ratio is determined using an average target value calculated from target image data over sample areas corresponding to the known diameter of the target spheres at the pixel and an average background value calculated from image data over averaging areas centered at the pixel and including mostly background image data in the target image not within the expected regions of the target spheres in the target image data, and an average background plane noise value calculated from image data over averaging areas centered at the pixel in at least one background image, the signal-to-noise ratio being determined as the average target value minus the average background value all divided by the average background plane noise value, and wherein the position of the target spheres are located using the signal-to-noise ratio at each pixel by summing the values of pixels that are spaced from one another with a spacing corresponding to the spacing between the expected centers of the target spheres in the rows and columns of target spheres in the array of target spheres to provide sums for all pixels lying in corresponding positions in subarrays of a width corresponding to the spacing in pixels between the centers of target spheres in each row of target spheres and of a height in pixels corresponding to the spacing between the centers of target spheres between rows of target spheres, dividing each sum by the total number of occurrences to obtain the average pixel value for each subarray and wherein the pixels in the corresponding positions of the subarrays having the largest average are identified as the center pixel locations of the target spheres.

14. An automated system for testing the resolution capabilities of ultrasound scanners, comprising:
 (a) an ultrasound phantom including an ultrasound phantom container, a tissue mimicking background material contained within the phantom container, and at least one array of target spheres having coplanar centers of known uniform spacing enclosed by the background material, wherein each target sphere in a row in the array has approximately a same known diameter and a same ultrasonic backscatter coefficient as other target spheres in the row and wherein the ultrasonic backscatter coefficient of each target sphere is different from a background ultrasonic backscatter coefficient of the background material, wherein the target spheres are arranged in a plurality of rows located at successive depths from a window of the phantom;
 (b) means for storing digitized target image data of an ultrasound image corresponding to a slice whose midplane is superimposed on a plane of an ultrasound phantom which contains the centers of an array of target spheres having a known spacing in the array and known diameter, and for storing digitized background image data of an ultrasound image corresponding to a slice of the ultrasound phantom which contains only background material;
 (c) means for retrieving the stored target image and background image data for analysis;
 (d) means for locating the positions of a plurality of the target spheres in the target image data based on the known spacing between and the known diameter of the target spheres in the ultrasound phantom;
 (e) means for determining a lesion signal-to-noise ratio at the located positions of the plurality of target spheres in the target image using an average target value calculated from target image data over sample areas corresponding to the known diameter of the target spheres at the located positions of the target spheres in the target image, an average background value calculated from image data over averaging areas centered at the located positions of the target spheres and including mostly background image data in the target image, not within the expected regions of the target spheres in the target image data, and an average background plane noise value calculated from image data over averaging areas centered at the located positioning of the target spheres in the background image, the signal-to-noise ratio being determined as the average target value minus the average background value all divided by the average background plane noise value.

15. The automated system of claim 14 wherein the target spheres of the ultrasound phantom are formed in the phantom in an array of regularly spaced rows and columns of target spheres, and including a means for averaging the background images and subtracting the averaged background image from the target image with truncation of negative pixels values to provide a subtracted image, and means for smoothing the subtracted image to provide a smoothed image, wherein the means for locating the positions of a plurality of the target spheres in the subtracted image does so by creating a virtual grid using the known target sphere dimensions and spacings, scanning the grid pixel by pixel over the smoothed subtracted image and summing the smoothed subtracted image values of the pixels below each grid point, dividing the final sum by the total number of grid points to produce a grid average for each increment of the grid position as it is scanned over the image, and after the entire image has been scanned, determining the maximum grid average representing the virtual grid that contains the highest summed value and designating that virtual grid as the located positions of the target spheres.

16. The automated system of claim 14 wherein the target spheres of the ultrasound phantom are formed in the phantom in an array of regularly spaced rows and columns of target spheres, and including a means for averaging the background images and subtracting the averaged background image from the target image with truncation of negative pixels values to provide a subtracted image, wherein the means for locating the positions of a plurality of the target spheres in the subtracted image does so by initially assuming that the first sphere is located in the upper left-hand corner of the smoothed subtracted image within a usable area of the subtracted image, forming a column of data with this point as the 0th index and placing the column of data into an array, reindexing the column of data to match the index with a specific grid location, and evaluating columns of data for each grid, with the assigned indices for each element determined based on the y-location of each pixel, the columns for each specific grid then acquired at intervals in the x-direction with each interval being separated by the known x-spacing of the spheres, completing a cycle to provide a vector of summed values with each summed value having a unique index in the vector corresponding to a grid that originates from a different y-location, dividing each element of the summed vector by the number of occurrences of the particular index within the virtual grid to yield the average grid pixel value, and then determining the maximum grid pixel value and retaining it along with the index at which it occurred to determine the most probable grid location in the y-direction for a specific x-coordinate, then incrementing the columns of data in the x-direction by one pixel and repeating the process until the entire image has been interrogated, and determining the grid with the maximum average grid value as corresponding to the most probable location of the actual grid of spheres with the y-coordinate of the grid determined from the index of the summing array and the x-coordinate given by the increment counter for the x-direction to provide a point corresponding to the upper-most left-hand sphere within the image, and then determining the locations of all remaining spheres based on the known spacing and diameter of the spheres.

17. The automated system of claim 14 wherein the average target pixel value $S_L$ is calculated using a circular region on the target image centered at the located positions of the target spheres with the region having a size corresponding to the dimensions of a sphere, and wherein the background value $S_B$ is determined as the average of all pixels with an area of a size a selected diameter greater than the size of the sphere and centered directly over the sphere with the area over the located positions of the target spheres not included.

18. The automated system of claim 17 wherein the noise value $\sigma_B$ is determined from regions in the background image having dimensions a selected amount larger than the diameter of the target spheres, with each region divided into subareas, each having dimensions which are smaller than the target sphere size, with the noise value associated with the subareas determined as follows:

$$\sigma_B = \left[ \frac{\sum_{n=1}^{N}(Z_n - Z_{nc})^2}{N} \right]^{1/2}$$

where $Z_n$ is the mean pixel value over the nth sub-area over a larger area in the background image centered at the pixel location of concern, $Z_{nc}=a+bX_n+cY_n$, and the coefficients a, b and c are found from the relations $\Sigma Z_n = aN + b\Sigma X_n + c\Sigma Y_n$, $\Sigma Z_n X_n = a\Sigma X_n + b\Sigma X^2_n + c\Sigma X_n Y_n$, and $\Sigma Z_n Y_n = a\Sigma Y_n + b\Sigma X_n Y_n + c\Sigma X_n Y_n$, and wherein the X and Y variables refer to the x- and y-coordinates of the center of the nth subarea within the region being interrogated.

19. The automated system of claim 14 further including means for analyzing the stored target image data and background image data to determine if the scanned format is rectangular or sector, and if the scanned format is determined to be a sector format, further including means for determining the bounding arc and sides of the sector in the target image and the background image.

20. The automated system of claim 14 wherein data for multiple background images are stored by the means for storing, and wherein the means for retrieving retrieves the data for the multiple background images, and wherein the noise value $\sigma_B$ is the mean value $\sigma_{MB}$ of the $\sigma$ values for the multiple background images.

21. The automated system of claim 14 wherein data for multiple background images are stored by the means for storing, and wherein the means for retrieving retrieves the data for the multiple background images, and further including means for averaging the multiple background images, subtracting the result from the target image to produce a subtracted work image and setting any pixels having values below zero to zero in the averaged image.

22. The automated system of claim 21 further including means for smoothing the subtracted work image using a kernel corresponding to the target sphere size and shape to create a smoothed image wherein each pixel represents an average of its surrounding pixels over an area equal to the target sphere size.

23. The automated system of claim 22 wherein the means for locating the positions of the plurality of target spheres locates the positions of the target spheres using the smoothed averaged background subtracted target image by summing the values of pixels that are spaced from one another with a spacing corresponding to the spacing between the expected centers of the target spheres in the rows and columns of target spheres in the array of target spheres to provide sums for all pixels lying in corresponding positions in subarrays of a width corresponding to the spacing in pixels between the centers of target spheres in each row of target spheres and of a height in pixels corresponding to the spacing between the centers of target spheres between rows of target spheres, dividing by the number of occurrences of each to obtain the average, and wherein the pixels in the corresponding positions of the subarrays having the largest average are identified as the center pixel locations of the target spheres.

24. The automated system of claim 14 further including means for displaying the maximum and minimum signal-to-noise ratio in each row of spheres.

25. The automated system of claim 14 wherein the means for locating the positions of a plurality of target spheres determines a lesion signal-to-noise ratio at each pixel in the target image data, wherein the lesion signal-to-noise ratio is determined using an average target value calculated from target image data over sample areas corresponding to the known diameter of the target spheres at the pixel and an average background value calculated from image data over averaging areas centered at the pixel and including mostly background image data in the target image not within the expected regions of the target spheres in the target image data, and an average background plane noise value calculated from image data over averaging areas centered at the pixel in the background image, the signal-to-noise ratio being determined as the average target value minus the average background value all divided by the average background plane noise value, and wherein the position of the target spheres are located using the signal-to-noise ratio at each pixel by summing the values of pixels that are spaced from one another with a spacing corresponding to the spacing between the expected centers of the target spheres in the rows and columns of target spheres in the array of target spheres to provide sums for all pixels lying in corresponding positions in subarrays of a width corresponding to the spacing in pixels between the centers of target spheres in each row of target spheres and of a height in pixels corresponding to the spacing between the centers of target spheres between rows of target spheres, divided by the total number of occurrences of each to obtain the average and wherein the pixels in the corresponding positions of the subarrays having the largest average are identified as the center pixel locations of the target spheres.

26. A method for testing the resolution of ultrasound scanners, comprising the steps of:

(a) taking a first ultrasound image having a scan slice centered on a plane of an ultrasound phantom containing an array of target spheres of known diameter with coplanar centers of known spacing;

(b) digitizing the first ultrasound image to form digitized target slice image data;

(c) taking a second ultrasound image having a scan slice containing a background material in the phantom and not target spheres;

(d) digitizing the second ultrasound image to form digitized background slice image data;

(e) storing the target image data and background image data;

(f) retrieving the target image and background image data for analysis;

(g) locating the positions of a plurality of the target spheres in the target image data based on the known spacing between and the known diameter of the target spheres in the ultrasound phantom;

(h) determining a lesion signal-to-noise ratio at the located positions of the plurality of target spheres in the target image using an average target slice value calculated from image data over sample areas corresponding to the known diameter of the target spheres at the located positions of the target spheres in the target image, an average background pixel value calculated from target image data over averaging areas centered at the located positions of the target spheres and including mostly background image data in the target image not within the expected regions of the target spheres in the target image data, and an average background plane noise value calculated from image data over averaging areas centered at the located positions of the target spheres in the background image, the signal-to-noise ratio being determined as the average target slice value minus the average background pixel value all divided by the average background plane noise value.

27. The method of claim 26 further including the step of displaying the lesion signal-to-noise ratio as a function of depth of the target spheres in the phantom.

28. The method of claim 26 wherein the target spheres are formed in the ultrasound phantom in an array of regularly spaced rows and columns of target spheres, and including a means for averaging the background images and subtracting the averaged background image from the target image with truncation of negative pixels values to provide a subtracted image, and including the step of smoothing the subtracted image to provide a smoothed subtracted image, wherein the step of locating the positions of a plurality of the target spheres in the subtracted image is carried out by creating a virtual grid using the known target sphere dimensions and spacings, scanning the grid pixel by pixel over the smoothed subtracted image and summing the smoothed subtracted values of the pixels below each grid point, dividing the final sum by the total number of grid points to produce a grid average for each increment of the grid position as it is scanned over the image, and after the entire image has been scanned, determining the maximum grid average representing the virtual grid that contains the highest summed value and designating that virtual grid as the located positions of the target spheres.

29. The method claim 26 wherein the target spheres are formed in the ultrasound phantom in an array of regularly spaced rows and columns of target spheres, and including a means for averaging the background images and subtracting the averaged background image from the target image with truncation of negative pixels values to provide a subtracted image, and including the step of smoothing the subtracted image to provide a smoothed subtracted image, wherein the step of locating the positions of a plurality of the target spheres in the subtracted image is carried out by initially assuming that the first sphere is located in the upper left-hand corner of the smoothed subtracted image within a usable area of the subtracted image, forming a column of data with this point as the 0th index and placing the column of data into an array, reindexing the column of data to match the index with a specific grid location, and evaluating columns of data for each grid, with the assigned indices for each element determined based on the y-location of each pixel, the columns for each specific grid then acquired at intervals in the x-direction with each interval being separated by the known x-spacing of the spheres, completing a cycle to provide a vector of summed values with each summed value having a unique index in the vector corresponding to a grid that originates from a different y-location, dividing each element of the summed vector by the number of occurrences of the particular index within the virtual grid to yield the average grid pixel value, and then determining the maximum grid pixel value and retaining it along with the index at which it occurred to determine the most probable grid location in the y-direction for a specific x-coordinate, then incrementing the columns of data in the x-direction by one pixel and repeating the process until the entire image has been interrogated, and determining the grid with the maximum average grid value as corresponding to the most probable location of the actual grid of spheres with the y-coordinate of the grid determined from the index of the summing array and the x-coordinate given by the increment counter for the x-direction to provide a point corresponding to the upper-most left-hand sphere within the image, and then determining the locations of all remaining spheres based on the known spacing and diameter of the spheres.

30. The method of claim 26 wherein the average target pixel value $S_L$ is calculated using a circular region on the target image centered at the located positions of the target spheres with the region having a size corresponding to the dimensions of a sphere, and wherein the background value $S_B$ is determined as the average of all pixels with an area of a size a selected diameter greater than the size of the sphere and centered directly over the sphere with the area over the located positions of the target spheres not included.

31. The method of claim 30 wherein the noise value $\sigma_B$ is determined from regions in the background image having dimensions a selected amount larger than the diameter of the target spheres, with each region divided into subareas, each having dimensions which are smaller than the target sphere size, with the noise value associated with the subareas determined as follows:

$$\sigma_B = \left[ \frac{\sum_{n=1}^{N} (Z_n - Z_{nc})^2}{N} \right]^{1/2}$$

where $Z_n$ is the mean pixel value over the nth sub-area over a larger area in the background image centered at the pixel location of concern, $Z_{nc} = a + bX_n + cY_n$, and the coefficients a, b and c are found from the relations $\Sigma Z_n = aN + b\Sigma X_n + c\Sigma Y_n$, $\Sigma Z_n X_n = a\Sigma X_n + b\Sigma X^2_n + c\Sigma X_n Y_n$, and $\Sigma Z_n Y_n = a\Sigma Y_n + b\Sigma X_n Y_n + c\Sigma X_n Y_n$, and wherein the X and Y variables refer to the x- and y-coordinates of the center of the nth sub-area within the region being interrogated.

32. The method of claim 26 further including the step of analyzing the stored target image data and background image data to determine if the scanned format is rectangular or sector, and if the scanned format is determined to be a sector format, further including the step of determining the bounding arc and sides of the sector in the target image and the background image.

33. The method of claim 26 wherein multiple background images are stored, and including the step of retrieving the data for the multiple background images, and wherein the noise value $\sigma_B$ is the mean value $\sigma_B$ of the $\sigma$ values for the multiple background images.

34. The method of claim 26 including the step of storing data for multiple background images, and wherein in the step of the retrieving the data for the multiple background images is retrieved, and further including the steps of averaging the multiple background images, setting any pixels having values below zero to zero in the averaged image and subtracting the result from the target image to produce a subtracted work image.

35. The method of claim 34 further including the step of smoothing the subtracted work image using a kernel corresponding to the target sphere size and shape to create a smoothed image wherein each pixel represents an average of its surrounding pixels over an area equal to the target sphere size.

36. The method of claim 35 wherein in the step of locating the positions of the plurality of target spheres the positions of the target spheres are located using the averaged background subtracted smoothed target image by summing the values of pixels that are spaced from one another with a spacing corresponding to the spacing between the expected centers of the target spheres in the rows and columns of target spheres in the array of target spheres to provide sums for all pixels lying in corresponding positions in subarrays of a width corresponding to the spacing in pixels between the centers of target spheres in each row of target spheres and of a height in pixels corresponding to the spacing between the centers of target spheres between rows of target spheres, dividing by the total number of occurrences of each to obtain averages and wherein the pixels in the corresponding positions of the subarrays having the largest average are identified as the center pixel locations of the target spheres.

37. The method of claim 26 further including the step of displaying the maximum and minimum signal-to-noise ratio in each row of spheres.

38. The method of claim 26 wherein the step of locating the positions of a plurality of target spheres determines a lesion signal-to-noise ratio at each pixel in the target image data, wherein the lesion signal-to-noise ratio is determined using an average target value calculated from target image data over sample areas corresponding to the known diameter of the target spheres at the pixel and an average background value calculated from image data over averaging areas centered at the pixel and including mostly background image data in the target image not within the expected regions of the target spheres in the target image data, and an average background plane noise value calculated from image data over averaging areas centered at the pixel in the background image, the signal-to-noise ratio being determined as the average target value minus the average background value all divided by the average background plane noise value, and wherein the position of the target spheres are located using the signal-to-noise ratio at each pixel by summing the values of pixels that are spaced from one another with a spacing corresponding to the spacing between the expected centers of the target spheres in the rows and columns of target spheres in the array of target spheres to provide sums for all pixels lying in corresponding positions in subarrays of a width corresponding to the spacing in pixels between the centers of target spheres in each row of target spheres and of a height in pixels corresponding to the spacing between the centers of target spheres between rows of target spheres, dividing by the total number of occurrences of each to obtain the averages, and wherein the pixels in the corresponding positions of the subarrays having the largest average are identified as the center pixel locations of the target spheres.

* * * * *